(12) United States Patent
Rai et al.

(10) Patent No.: US 9,127,119 B2
(45) Date of Patent: Sep. 8, 2015

(54) POLYCARBONATE COMPOSITIONS HAVING IMPROVED THERMAL DIMENSIONAL STABILITY AND HIGH REFRACTIVE INDEX

(71) Applicant: SABIC Global Technologies B.V., Bergen op Zoom (NL)

(72) Inventors: Roopali Rai, Bangalore (IN); Theo Hoeks, Bergen op Zoom (NL); Jaykisore Pal, Bangalore (IN); BG Umesh, Dharwad (IN); Shantaram Narayan Naik, Bangalore (IN); Subramanyam Santhanam, Bangalore (IN); Shweta Hegde, Bangalore (IN); Hariharan Ramalingham, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 5 days.

(21) Appl. No.: 13/740,094

(22) Filed: Jan. 11, 2013

(65) Prior Publication Data

US 2014/0200308 A1    Jul. 17, 2014

(51) Int. Cl.
| | |
|---|---|
| *C08G 75/00* | (2006.01) |
| *C08G 65/38* | (2006.01) |
| *C08G 65/40* | (2006.01) |
| *C08G 69/26* | (2006.01) |
| *C08G 75/02* | (2006.01) |
| *C08L 81/00* | (2006.01) |
| *C08G 64/08* | (2006.01) |
| *C08L 69/00* | (2006.01) |

(52) U.S. Cl.
CPC .............. *C08G 64/081* (2013.01); *C08G 64/08* (2013.01); *C08L 69/00* (2013.01)

(58) Field of Classification Search
None
See application file for complete search history.

(56) References Cited

U.S. PATENT DOCUMENTS

| | | |
|---|---|---|
| 4,043,980 A | 8/1977 | Baron et al. |
| 4,174,359 A | 11/1979 | Sivaramakrishnan et al. |
| 4,323,668 A | 4/1982 | Brunelle |
| 4,426,514 A | 1/1984 | Krishnan et al. |
| 4,430,485 A | 2/1984 | Mark |
| 4,446,297 A | 5/1984 | Krishnan et al. |
| 4,448,950 A | 5/1984 | Baron et al. |
| 4,469,833 A | 9/1984 | Mark |
| 4,473,685 A | 9/1984 | Mark |
| 4,490,504 A | 12/1984 | Mark |
| 4,515,937 A | 5/1985 | Baron et al. |
| 5,278,694 A | 1/1994 | Wheatley et al. |
| 5,321,086 A | 6/1994 | Kozakura et al. |
| 5,344,910 A | 9/1994 | Sybert |
| 5,532,331 A | 7/1996 | Bales et al. |
| 7,132,498 B2 | 11/2006 | McCloskey et al. |
| 7,547,755 B2 | 6/2009 | Heuer |
| 7,642,335 B2 | 1/2010 | Scindia et al. |
| 7,671,164 B2 | 3/2010 | Brack et al. |
| 7,786,246 B2 | 8/2010 | Jansen et al. |
| 8,064,140 B2 | 11/2011 | Hoeks et al. |
| 2007/0219344 A1* | 9/2007 | Steiger et al. ............ 528/373 |
| 2009/0036633 A1* | 2/2009 | Scindia et al. ............ 528/173 |
| 2009/0105393 A1* | 4/2009 | Jansen et al. ............ 524/502 |
| 2011/0151262 A1 | 6/2011 | Heuer et al. |

FOREIGN PATENT DOCUMENTS

| | | |
|---|---|---|
| EP | 0046558 | 3/1982 |
| EP | 0084578 | 8/1983 |
| JP | 2002/114842 | 4/2002 |
| JP | 2005/020683 | 1/2005 |
| JP | 2010/256621 | 11/2010 |
| JP | 2011/029051 | 2/2011 |
| JP | 2011/089050 | 5/2011 |
| WO | WO 94/02533 | 2/1994 |
| WO | WO 01/42337 | 6/2001 |
| WO | WO 2009/016550 | 2/2009 |
| WO | WO 2011/062104 | 5/2011 |
| WO | WO 2011/062121 | 5/2011 |

* cited by examiner

*Primary Examiner* — Susannah Chung
*Assistant Examiner* — Robert T Butcher
(74) *Attorney, Agent, or Firm* — Baker & Hostetler LLP

(57) ABSTRACT

Disclosed herein are methods and compositions of polycarbonate compositions having, among other characteristics, improved thermal dimensional stability, hydrolytic stability and high refractive index. The resulting polycarbonate copolymer composition, comprising a polycarbonate and a polysulfone, can be used in the manufacture of articles for optical applications. This abstract is intended as a scanning tool for purposes of searching in the particular art and is not intended to be limiting of the present invention.

57 Claims, 1 Drawing Sheet

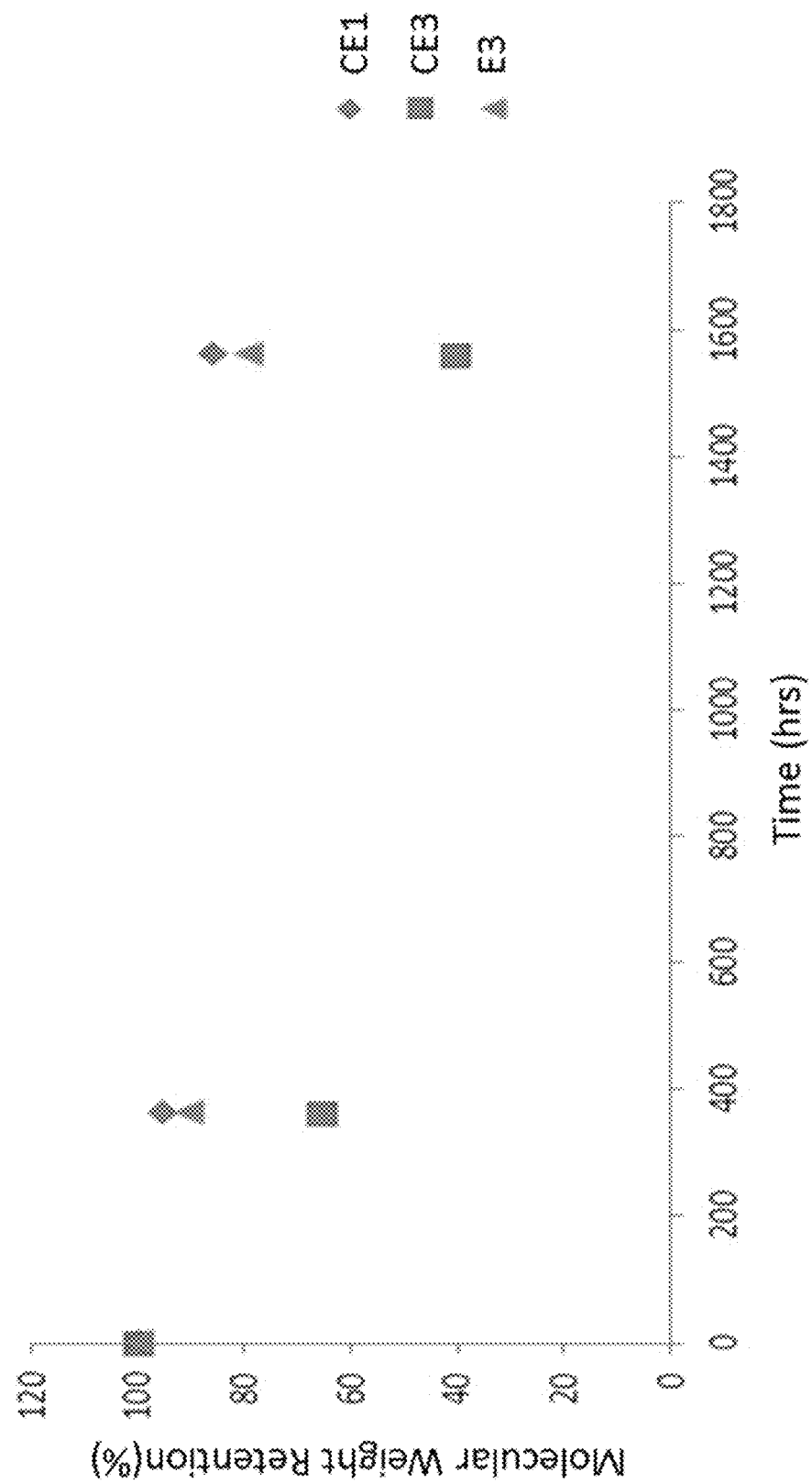

POLYCARBONATE COMPOSITIONS HAVING IMPROVED THERMAL DIMENSIONAL STABILITY AND HIGH REFRACTIVE INDEX

BACKGROUND OF THE INVENTION

Polycarbonates are synthetic thermoplastic resins that can, for example, be derived from bisphenols and phosgene, or their derivatives, or by a melt polymerization process. Polycarbonates are a useful class of polymers having many desired properties. They are useful for forming a wide variety of products, such as by molding, extrusion, and thermoforming processes. They are highly regarded for optical clarity, high heat resistance, and enhanced impact strength and ductility at room temperature.

Polycarbonates have seen greater use in applications that require superior optical properties such as high refractive index (RI) and optical clarity, based in part on their cost, design flexibility, and safety profiles. Currently, bisphenol A ("BPA") based polycarbonates are being used for some optical applications. However, these materials fall short of addressing the current requirements for many optical applications. For example, these BPA-based polycarbonates do not have the requisite heat resistance or refractive index for more demanding optical applications. Moreover, many of the highest index commercial lenses currently available are based on quasi thermoplastic-polyurethane/polyurea based resins.

Therefore, there remains a need in the art for completely thermoplastic polymer compositions, and articles formed from such compositions, having improved dimensional stability, hydrolytic stability and high refractive index.

BRIEF SUMMARY OF THE INVENTION

In accordance with the purpose(s) of the present invention, as embodied and broadly described herein, this disclosure, in one aspect, relates to polycarbonate compositions having, among other characteristics, improved thermal dimensional stability, hydrolytic stability, and high refractive index. To that end, according to the aspects, compositions are disclosed that generally comprise a polycarbonate copolymer comprising units derived from an aromatic dihydroxy compound, a sulfone unit, and optionally ester units.

In further aspects, disclosed are articles comprising the disclosed composition, for example an article as a component in an optical device.

In still further aspects, disclosed are methods of making the disclosed compositions and articles.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying FIGURE, which are incorporated in and constitute a part of this specification, illustrate several aspects and together with the description serve to explain the principles of the invention.

FIG. 1 shows representative hydrolytic stability data for a representative disclosed composition of the present invention compared to comparator compositions.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question may be the value designated, some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

The terms "BPA" or "bisphenol A," which can be used interchangeably, as used herein refers to a compound having a structure represented by the formula:

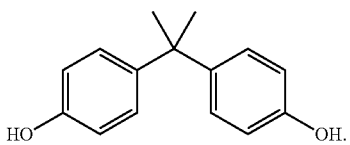

BPA can also be referred to by the name 4,4'-(propane-2,2-diyl)diphenol; p,p'-isopropylidenebisphenol; or 2,2-bis(4-hydroxyphenyl)propane. BPA has the CAS #80-05-7.

The terms "BisAP" or "bisphenol AP," which can be used interchangeably, as used herein refers to a compound having a structure represented by the formula:

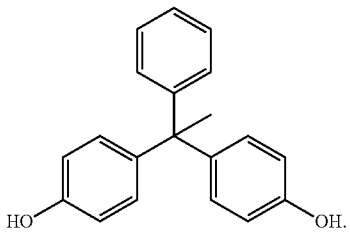

BisAP can also be referred to by the name 4,4'-(1-phenylethylidene)bisphenol; 1,1-bis(4-hydroxyphenyl)-1-phenylethane, and has the CAS #1571-75-1.

The term "PPPBP" as used herein refers to a compound having a structure represented by the formula:

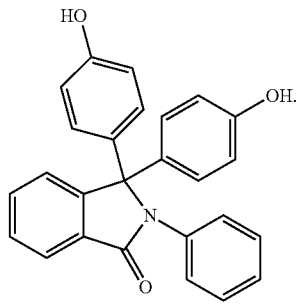 [SMILES: O=C1c2ccccc2C(c2ccc(O)cc2)(c2ccc(O)cc2)N1c1ccccc1]

PPPBP can also be referred to by the following names: 2-Phenyl-3,3-bis(4-hydroxyphenyl)phthalimidine; N-Phenyl-3,3-bis(4-hydroxyphenyl)phthalimidine; 3,3-bis(4-hydroxyphenyl)-2-phenylisoindolin-1-one; 3,3-bis(4-hydroxyphenyl)-2-phenyl-2,3-dihydro-1H-isoindol-1-one. PPPBP has the CAS #6607-41-6.

The terms "BisAP polycarbonate" or "bisphenol AP-PC," which can be used interchangeably, as used herein refers to a polycarbonate copolymer comprising repeating carbonate units derived from BisAP and at least one other dihydroxy monomer such as a bisphenol. For example, BisAP-PC can be a polycarbonate copolymer comprising BisAP and bisphenol A monomer units.

The term "PPPBP-PC" refers to a polycarbonate copolymer comprising repeating carbonate units derived from PPPBP and at least one other dihydroxy monomer such as a bisphenol A. For example, PPPBP-PC can be a polycarbonate copolymer comprising PPPBP and bisphenol A monomer units.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or PC-copolymers, by methods well known to a person having ordinary skill in the art. It is to be understood that as used herein, Mn is measured by gel permeation chromatography and as calibrated with polystyrene standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography and as calibrated with polystyrene standards. For example, gel permeation chromatography can be carried out using a crosslinked styrene-divinyl benzene column, at a sample concentration of 1 milligram per milliliter with appropriate mobile phase solvents.

As used herein, the terms "polydispersity index" or "PDI" can be used interchangeably, and are defined by the formula:

$$PDI = Mw/Mn.$$

The PDI has a value equal to or greater than 1, but as the polymer chains approach uniform chain length, the PDI approaches unity.

The terms "polycarbonate" or "polycarbonates" as used herein includes copolycarbonates, homopolycarbonates and (co)polyester carbonates.

The terms "residues" and "structural units", used in reference to the constituents of the polymers, are synonymous throughout the specification.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

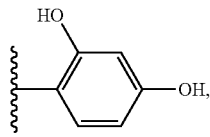 [SMILES: *c1ccc(O)cc1O]

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some aspects, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

In some aspects, a structure of a compound can be represented by a formula:

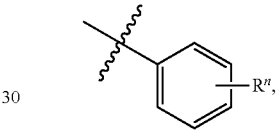

which is understood to be equivalent to a formula:

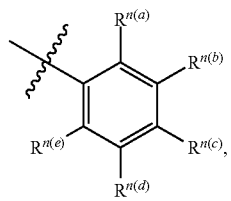

wherein n is typically an integer. That is, $R^n$ is understood to represent five independent substituents, $R^{n(a)}$, $R^{n(b)}$, $R^{n(c)}$, $R^{n(d)}$, and $R^{n(e)}$. By "independent substituents," it is meant that each R substituent can be independently defined. For example, if in one instance $R^{n(a)}$ is halogen, then $R^{n(b)}$ is not necessarily halogen in that instance.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonate Composition

As briefly described above, the present invention provides polycarbonate compositions having improved thermal dimensional stability, hydrolytic stability and high refractive index.

In one aspect, the present disclosure provides a polycarbonate copolymer composition comprising: A polycarbonate copolymer composition comprising: monomeric units (a) comprising a carbonate unit derived from a first aromatic dihydroxy compound; monomeric sulfone units (b) comprising units derived from formulas (i) and (ii):

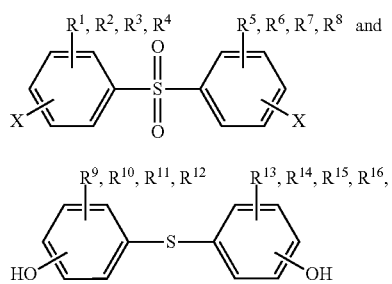

wherein $R^1$-$R^{16}$ are each independently selected from hydrogen, halogen, nitro, cyano, $C^1$-$C^{20}$ alkyl, $C^4$-$C^{20}$ cycloalkyl, and $C^6$-$C^{20}$ aryl; wherein each X is independently halide or —OH; and wherein the weight-averaged molecular weight of the polymer is from about 3,000 to about 80,000. In a further aspect, each X is the same moiety, that is, both are either halide or —OH. In a still further aspect, each X is halide. In a yet further aspect, each X is —Cl. In an even further aspect, each X is —OH.

In a further aspect, the sulfone units (b) comprise structural units of formula:

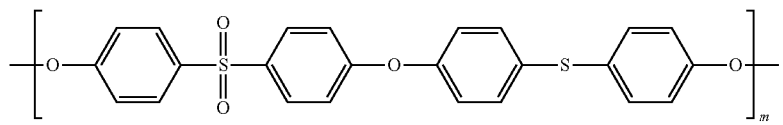

wherein m is any desired integer based upon the desired chain length.

In a further aspect, the monomeric units (a) further comprise a carbonate unit derived from a second aromatic dihydroxy compound.

In another aspect, the polycarbonate compositions comprise monomeric units (c) comprising a carbonate unit derived from a second aromatic dihydroxy compound. In a further aspect, the carbonate unit is derived from bisphenol A, PPPBP, bisphenol acetophenone or a combination thereof. In a yet further aspect, the carbonate unit of (a) comprises PPPBP, and the carbonate unit of (c) comprises bisphenol A.

In another aspect, the monomeric units (c) further comprise a ester unit derived from a C6-C44 aliphatic diol, a C6-C44 aliphatic dicarboxylic acid, or a derivative thereof. In a further aspect, the monomeric units (c) comprise a polyester-carbonate. In a still further aspect, the ester unit is derived from a aliphatic dicarboxylic acid of the formula:

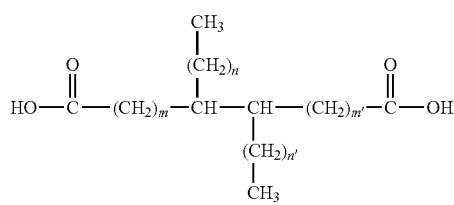

where m and m' are independently 0 to 38, n and n' are independently 0 to 38, and the sum m+m'+n+n' is an integer from 8 to 38. In a yet further aspect, the aliphatic dicarboxylic acid comprises C36 aliphatic dicarboxylic acid, C44 aliphatic dicarboxylic acid, or a combination thereof. In an even further aspect, the C36 aliphatic dicarboxylic acid comprises a mixture of hydrogenated dimer fatty acids.

Polycarbonate Polymer

In various aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In various aspects, the polycarbonate can comprise copolymers comprising two or more distinct carbonate units. For example, a polycarbonate copolymer can comprise repeating carbonate units derived from BisAP and a second, chemically distinct dihydroxy monomer such as a bisphenol, e.g. bisphenol A. Alternatively, a polycarbonate copolymer can comprise repeating carbonate units derived from PPPBP and a second, chemically distinct dihydroxy monomer such as a bisphenol, e.g. bisphenol A.

In various aspects, polycarbonates disclosed herein have repeating structural carbonate units of the formula (1):

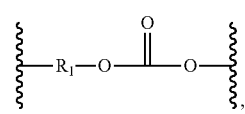

wherein at least 60 percent of the total number of $R^1$ groups contains aromatic organic groups and the balance thereof are aliphatic, alicyclic, or aromatic groups. "Polycarbonate" as used herein includes polymers, homopolycarbonates and copolycarbonates (i.e. copolymers comprising different $R^1$ moieties in the polycarbonate), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like.

In a further aspect, the $R^1$ group is a divalent aromatic group, derived from a dihydroxy aromatic compound of the formula (2):

$$HO-A^1-Y^1-A^2-OH \qquad (2),$$

wherein each of $A^1$ and $A^2$ is a monocyclic divalent arylene group, and $Y^1$ is a single bond or a bridging group having one or two atoms that separate $A^1$ from $A^2$. In a still further aspect, one atom separates $A^1$ from $A^2$. In a yet further aspect, when each of $A^1$ and $A^2$ is phenylene, $Y^1$ is para to each of the hydroxyl groups on the phenylenes. In an even further aspect, non-limiting examples of these groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group Y$^1$ can be a hydrocarbon group or a saturated hydrocarbon group such as methylene, cyclohexylidene, or isopropylidene.

In a further aspect, useful dihydroxy compounds have the formula (3):

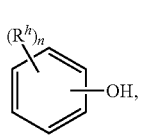

(3)

wherein each R$^h$ is independently a halogen atom, a C1-10 hydrocarbyl such as a C1-10 alkyl group, a halogen substituted C1-10 hydrocarbyl such as a halogen-substituted C1-10 alkyl group, and n is 0 to 4. In a still further aspect, the halogen is usually bromine.

In a further aspect, dihydroxy aromatic compounds of formula (2) are bisphenol compounds of general formula (4):

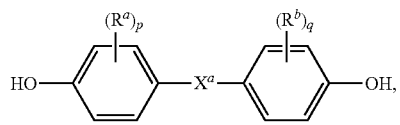

(4)

wherein R$^a$ and R$^b$ each represent a halogen atom or a monovalent hydrocarbon group and can be the same or different; p and q are each independently integers of 0 to 4; and X$^a$ represents a single bond or a group of formulas (5):

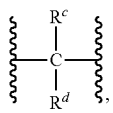

(5)

or (6):

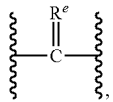

(6)

wherein R$^c$ and R$^d$ are each independently hydrogen, C1-12 alkyl, C1-12 cycloalkyl, C7-12 arylalkyl, C1-12 heteroalkyl, or cyclic C7-12 heteroarylalkyl, and Re is a divalent C1-12 hydrocarbon group. In an aspect, R$^c$ and R$^d$ are each the same hydrogen or C1-4 alkyl group, specifically the same C1-3 alkyl group, even more specifically, methyl.

In a further aspect, R$^c$ and R$^d$ taken together represent a C3-20 cyclic alkylene group or a heteroatom-containing C3-20 cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. In a still further aspect, heteroatom-containing cyclic alkylene group comprises at least one heteroatom with a valency of 2 or greater, and at least two carbon atoms. For example, heteroatoms in the heteroatom-containing cyclic alkylene group include —O—, —S—, and —N(Z)—, wherein Z is a substituent group selected from hydrogen, hydroxy, C1-12 alkyl, C1-12 alkoxy, or C1-12 acyl.

In a further aspect, bisphenols (4) used in the preparation of polycarbonates comprising polycarbonphthalimidine carbonate repeating units of formula (4a):

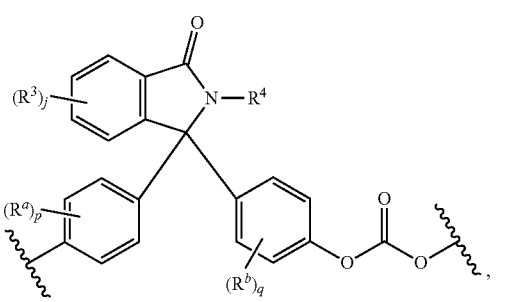

(4a)

wherein R$^a$, R$^b$, p, and q are as in formula (4), R$^3$ is each independently a C1-6 alkyl group, j is 0 to 4, and R$^4$ is a C1-6 alkyl, phenyl, or phenyl substituted with up to five C1-6 alkyl groups. In a still further aspect, the phthalimidine carbonate repeating units comprises a residue of formula (4b):

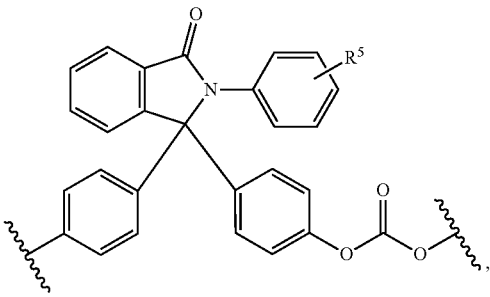

wherein R$^5$ is hydrogen or a C1-6 alkyl. In an aspect, R$^5$ is hydrogen. Carbonate units (4a) wherein R$^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

In a further aspect, the bisphenol carbonate comprises repeating units of this type are the isatin carbonate units of formula (4c):

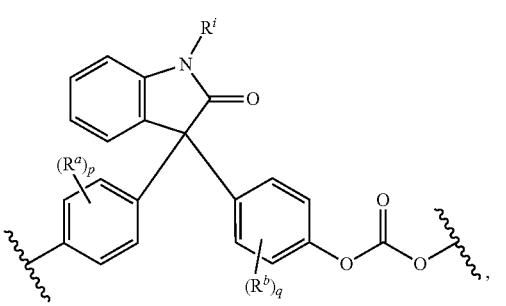

(4c)

and (4d):

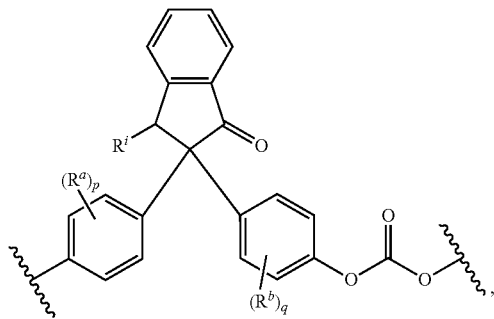

wherein $R^a$ and $R^b$ are each independently C1-12 alkyl, p and q are each independently 0 to 4, and $R^i$ is C1-12 alkyl, phenyl, optionally substituted with 1 to 5 C1-10 alkyl, or benzyl optionally substituted with 1 to 5 C1-10 alkyl. In a still further aspect, $R^a$ and $R^b$ are each methyl, p and q are each independently 0 or 1, and R' is C1-4 alkyl or phenyl.

In a further aspect, bisphenol carbonate repeating units comprise residues derived from bisphenols (4) wherein $X^b$ is a substituted or unsubstituted C3-18 cycloalkylidene include the cyclohexylidene-bridged, alkyl-substituted bisphenol of formula (4e):

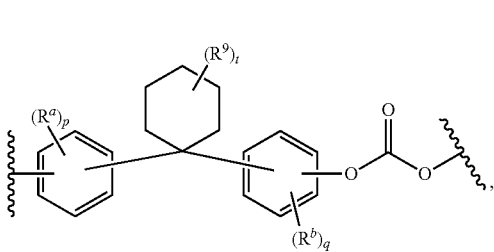

wherein $R^a$ and $R^b$ are each independently C1-12 alkyl, $R^g$ is C1-12 alkyl, p and q are each independently 0 to 4, and t is 0 to 10. In a specific aspect, at least one of each of $R^a$ and $R^b$ are disposed meta to the cyclohexylidene bridging group. In a still further aspect, $R^a$ and $R^b$ are each independently C1-4 alkyl, $R^g$ is C1-4 alkyl, p and q are each 0 or 1, and t is 0 to 5. In a yet further aspect, $R^a$, $R^b$, and $R^g$ are each methyl, r and s are each 0 or 1, and t is 0 or 3, specifically 0.

In a further aspect, bisphenol carbonate units comprise residues derived from bisphenol (4) wherein $X^b$ is a substituted or unsubstituted C3-18 cycloalkylidene include repeating units represented of formula (4f), or structural variations or analogs thereof:

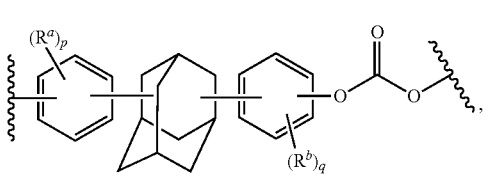

and repeating units of formula (4g), or structural variations or analogs thereof:

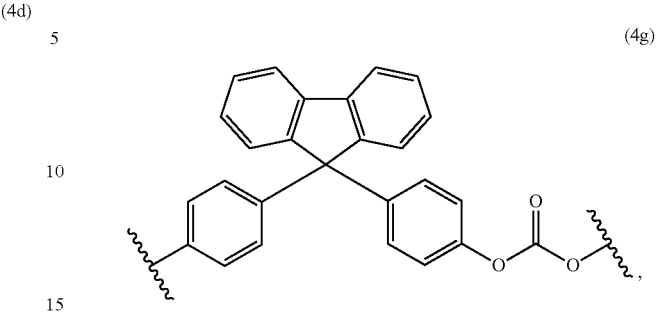

wherein $R^a$ and $R^b$ are each independently C1-12 alkyl, and p and q are each independently 1 to 4. In a specific aspect, at least one of each of $R^a$ and $R^b$ are disposed meta to the cycloalkylidene bridging group. In a still further aspect, $R^a$ and $R^b$ are each independently C1-3 alkyl, and p and q are each 0 or 1. In a yet further aspect, $R^a$, $R^b$ are each methyl, p and q are each 0 or 1. In various aspects, carbonates comprising units (4a) to (4g) are useful for making polycarbonates of the present invention with high glass transition temperatures (Tg) and high heat distortion temperatures.

In one aspect, the bisphenol compound is selected from 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methylphenyl)cyclohexane 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, or combinations comprising one or more of the foregoing dihydroxy aromatic compounds.

In a further aspect, the bisphenol compound comprises a compound selected from 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4- hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl) phthalimidine ("PPPBP"), 9,9-bis(4-hydroxyphenyl)fluorene, and, 4'-(1-phenylethylidene)bisphenol; 1,1-bis(4-hydroxyphenyl)-1-phenylethane ("BisAP"), or combinations comprising one or more of the foregoing dihydroxy aromatic compounds. In a still further aspect, the bisphenol comprises combinations of one or more dihydroxy aromatic compound. In another aspect, other types of diols can be present in the polycarbonate.

In yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4-(4'-(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

In various further aspects, polycarbonates and copolycarbonates useful in the present invention comprise units derived from bisphenols represented by formulas (7) and (8):

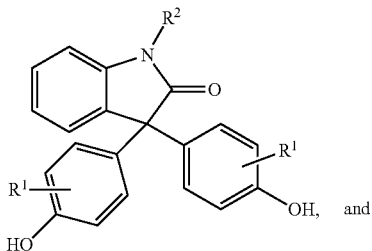

(7)

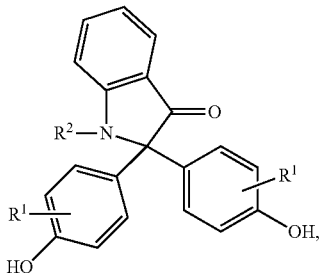

(8)

wherein each $R^1$ is independently selected from hydrogen or a C1-C10-alkyl and $R^2$ is C1-C10-alkyl, or phenyl or benzyl in each case unsubstituted or substituted by at least one member selected from the group consisting of hydrogen and C1-C10-alkyl radical.

In various further aspects, polycarbonates useful in the present invention are disclosed in WO2011062121, WO2011062104, JP20050206834, JP2011089050, JP2011029051, US20110151262, U.S. Pat. No. 5,344,910, and U.S. Pat. No. 7,547,755.

In various aspects, polycarbonates can comprise a homopolymer, copolymer, terpolymer, or a polymer containing several different residues derived from other monomer compounds.

In one aspect, polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). Such copolymers further contain, in addition to recurring carbonate chain units of the formula (1), carbonate units derived from oligomeric ester-containing dihydroxy compounds (also referred to herein as hydroxy end-capped oligomeric arylate esters) comprising repeating units of formula (9):

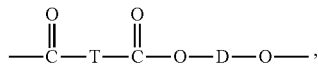

wherein D is a divalent group derived from a dihydroxy compound, and may be, for example, a C2-10 alkylene group, a C6-20 alicyclic group, a C6-20 aromatic group or a C2-20 polyoxyalkylene group in which the alkylene groups contain 2 to about 6 carbon atoms, specifically 2, 3, or 4 carbon atoms; and T is a divalent group derived from a dicarboxylic acid, and may be, for example, a C2-20 aliphatic, C6-20 alkylene group, a C6-20 alicyclic group, a C6-20 alkyl aromatic group, or a C6-20 aromatic group.

A copolymer is defined as a polymer containing at least two different monomers. When a copolymer contains three different monomers it can be referred to as a terpolymer as well. Generally, polyester-polycarbonates can have the structure of formula (9), wherein some aspects D is a C2-30 alkylene group having a straight chain, branched chain, or cyclic (including polycyclic) structure. In a further aspect, D is derived from a dihydroxy aromatic compound of formula (4) above. In a still further aspect, D is derived from a dihydroxy aromatic compound of formula (3) above.

In a specific aspect, where the aliphatic chain is long, for example greater than about 18 carbon atoms, it is necessary that it is branched to prevent crystallization. Thus, in a specific aspect, D is a C14-20 alkylene group having a branched chain structure, such that the aliphatic alkylene chain will not crystallize in the polymer.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific aspect, D is a C2-6 alkylene group and T is p-phenylene, m-phenylene, naphthalene, a divalent cycloaliphatic group, or a combination thereof. This class of polyester includes the poly(alkylene terephthalates).

Where ester units are formed in the absence of other linking chemistry (e.g., carbonate precursors such as phosgene, or diaryl carbonates), the individual ester oligomerize to form a polyester unit, also referred to as a polyester block. The polyester unit can then be copolymerized in the presence of carbonate precursor and dihydroxy compounds to form the polyester-polycarbonate. The number of repeating ester units in a polyester unit of such a polyester-polycarbonate is typically greater than or equal to 4, specifically greater than or equal to 5, and more specifically greater than or equal to 8. In a further aspect, the number of ester units of formula (9) is less than or equal to 100, specifically less than or equal to 90, more specifically less than or equal to 70. It will be understood that the low and high endpoint values for the number of ester units of formula (9) present are independently combinable. In a specific aspect, the number of ester units of formula (9) in a polyester-polycarbonate can be 4 to 50, specifically 5 to 30, more specifically 8 to 25, and still more specifically 10 to 20. Conversely, where ester units are formed in the presence of other linking chemistry such as carbonate precursors, a more random polyester-polycarbonate can form, with individual ester units or smaller blocks of repeating ester units of 2 or 3, interspersed with one or more of the other linking chemistry (e.g. carbonate units). Overall, in the polyester-polycarbonate, the molar ratio of ester units to carbonate units in the polyester-polycarbonate copolymers may vary broadly, for example 1:99 to 99:1, specifically 10:90 to 90:10, more specifically 25:75 to 75:25, depending on the desired properties of the final composition.

In one aspect, the ester units of a polyester-polycarbonate may be derived from the reaction of a combination of isophthalic and terephthalic diacids (or derivatives thereof) with resorcinol. In another aspect, the polyester unit of a polyester-polycarbonate is derived from the reaction of a combination of isophthalic acid and terephthalic acid with bisphenol-A. Alternatively or in addition, the carbonate units can be derived from resorcinol and/or bisphenol A. In still further aspects, the carbonate units of the polyester-polycarbonate can be derived from resorcinol and bisphenol A in a resulting molar ratio of resorcinol carbonate units to bisphenol A carbonate unit of 1:99 to 99:1.

In one aspect, the disclosed composition comprises a polyester-polycarbonate, and specifically a polyester-polycarbonate copolymer in which the ester units of formula (9) comprise soft block ester units, also referred to herein as aliphatic dicarboxylic acid ester units.

In another aspect, the ester unit can be a C6-20 aliphatic dicarboxylic acid ester unit (where C6-20 includes the terminal carboxyl groups), and may be straight chain (i.e., unbranched) or branched chain dicarboxylic acids, cycloalkyl or cycloalkylidene-containing dicarboxylic acids units, or combinations of these structural units. In one aspect, the C6-20 aliphatic dicarboxylic acid ester unit includes a straight chain alkylene group comprising methylene (—CH2-) repeating units.

In a further aspect, a useful ester unit comprises units of formula (9a):

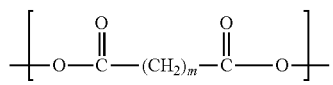

where m is 4 to 18. In a specific aspect of formula (9a), m is 8 to 10.

In a further aspect, the polyester-polycarbonate can include less than or equal to 25 mol % of the ester unit. In a still further aspect, units of formula (9a) are present in an amount of 0.5 to 10 mol %, specifically 1 to 9 mol %, and more specifically 3 to 8 mol %, based on the total molar weight of the polycarbonate.

In another aspect, the polyester-polycarbonate can comprise a copolymer of soft block ester units and carbonate units. The polyester-polycarbonate is shown in formula (9b):

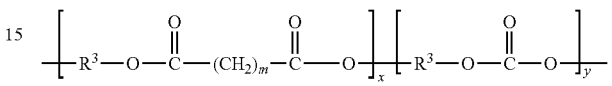

where each $R^3$ is independently derived from a dihydroxyaromatic compound of formula (4) or (3), m is 4 to 18, and x and y each represent, in one aspect, average weight percentages of the polyester-polycarbonate where the average weight percentage ratio x:y is 10:90 to 0.5:99.5, specifically 9:91 to 1:99, and more specifically 8:92 to 3:97, where x+y is 100. In a further aspect, each $R^3$ in formula (9b) is independently derived from a dihydroxyaromatic compound of formula (8), alone or in combination with another non-identical dihydroxyaromatic compound of formula (4) or (3). In a still further aspect, the average weight percentage ratio x:y is 2:98 to 32:68, where x+y is 100. In a yet further aspect, the average mole percent ratio x:y is 7.5:92.5 to 30:70, where x+y is 100.

Soft block ester units, as defined herein, can be derived from an alpha, omega C6-20 aliphatic dicarboxylic acid or a reactive derivative thereof. In a further aspect, the soft block ester units can be derived from an alpha, omega C10-12 aliphatic dicarboxylic acid or a reactive derivative thereof. In yet further aspect, the carboxylate portion of the aliphatic ester unit of formula (9a), in which the terminal carboxylate groups are connected by a chain of repeating methylene (—CH2-) units (where m is as defined for formula (9a)), is derived from the corresponding dicarboxylic acid or reactive derivative thereof, such as the acid halide (specifically, the acid chloride), an ester, or the like. Thus, in one aspect, soft block units of Formula (9a) are derived from esterification of the corresponding unbranched alpha-omega aliphatic dicarboxylic acid of formula (9c):

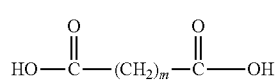

where m is 4 to 18.

Exemplary alpha, omega dicarboxylic acids (from which the corresponding acid chlorides may be derived) include alpha, omega C6 dicarboxylic acids such as hexanedioic acid (also referred to as adipic acid); alpha, omega C10 dicarboxylic acids such as decanedioic acid (also referred to as sebacic acid); alpha, omega C12 dicarboxylic acids such as dodecanedioic acid (DDDA), and alpha, omega C16 dicarboxylic acids such as hexadecanedioic acid (HDDA). It will be appreciated that the aliphatic dicarboxylic acid is not limited to these exemplary carbon chain lengths, and that other chain lengths within the C6-20 limitation may be used. An exemplary example of the polyester-polycarbonate having ester units comprising a straight chain methylene group and a bisphenol A polycarbonate group is shown in formula (9d):

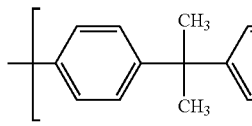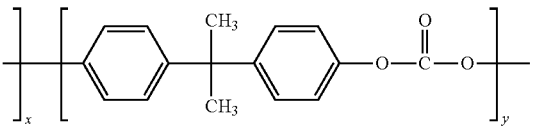

where m is 8, and the average weight ratio of x:y is 6:94.

In another aspect, the polycarbonate comprises aliphatic units that are either aliphatic carbonate units derived from aliphatic diols, or aliphatic ester units derived from aliphatic diacids having greater than 13 carbons, or a combination thereof. In a further aspect, the aliphatic diol can comprise a C14-44 aliphatic diol, for example, C36 branched fatty diol. In a still further aspect, the aliphatic diacid can comprise a C14-44 aliphatic diacid, for example C36 diacid.

In one aspect, the C14-44 aliphatic diacid can be a branched chain dicarboxylic acid, and can contain a cyclic group. In a further aspect, C14-44 aliphatic diacid ester unit can be a branched chain C14-44 aliphatic diacid ester unit or derivative thereof comprising the formula (9e):

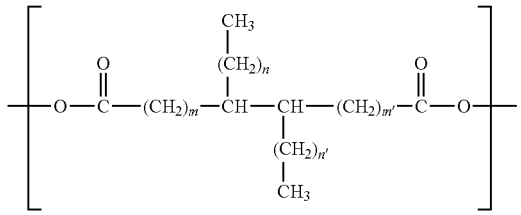

where m and m' are independently 0 to 38, n and n' are independently 0 to 38, and the sum m+m'+n+n' is an integer from 8 to 38. In a further aspect, the aliphatic dicarboxylic acid is a C20-44 aliphatic dicarboxylic acid where the sum m+m'+n+n' is an integer from 14 to 38. In a still further aspect, the aliphatic dicarboxylic acid is a C21-44 aliphatic dicarboxylic acid where the sum m+m'+n+n' is an integer from 15 to 38. In a yet further aspect, the aliphatic dicarboxylic acid is a C22-44 aliphatic dicarboxylic acid where the sum m+m'+n+n' is an integer from 16 to 38. In an even further aspect, aliphatic dicarboxylic acids of formula (9e) are branched.

In a still further aspect, a C36 aliphatic diacid has the structure of formula (9e), where m and m' are independently 0 to 30, n and n' are independently 0 to 30, and the sum m+m'+n+n' is 30. In yet further aspect, a C36 aliphatic diacid has the structure of formula (9e), where each m and m' is independently 5 to 10, each n and n' is independently 5 to 10, and the sum m+m'+n+n' is 30. In an even further aspect, m and m' are independently 7 or 8, n and n' are independently 7 or 8, and the sum m+m'+n+n' is 30. In a still further aspect, a C$_{44}$ aliphatic diacid has the structure of formula (9e), where m and m' are independently 0 to 30, n and n' are independently 0 to 30, and the sum m+m'+n+n' is 38. In a yet further aspect, m and m' are independently 12 or 13, n and n' are independently 6 or 7, and the sum m+m'+n+n' is 38. Such diacids are also referred to generally as dimeric fatty acids, and may be derived from the condensation of readily available biologically-derived feedstocks.

In another aspect, the polyester-polycarbonate having C6-44 aliphatic dicarboxylic acid ester units is a copolymer of ester units and carbonate units, represented by formula (9f):

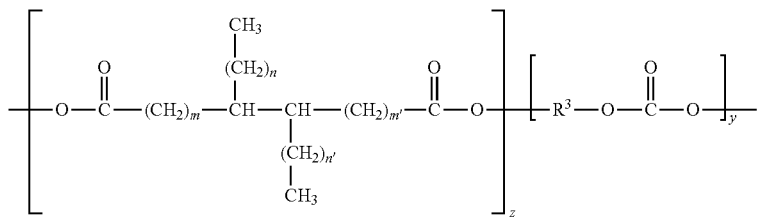

where each R$^3$ is independently derived from a dihydroxy aromatic compound of formula (8), alone or in combination with another non-identical dihydroxy aromatic compound of formula (4) or (3), m, m', n, and n' are as defined for formula (9e). In one aspect, z and y may each represent average weight percentages of the polyester-polycarbonate where the average weight percentage ratio z:y is 2:98 to 32:68, where z+y is 100. In a further aspect, the average mole percent ratio z:y is 7.5:92.5 to 30:70, where z+y is 100.

In a further aspect, ester units of formula (9e) are derived from esterification of the corresponding carboxylic acid of formula (9g):

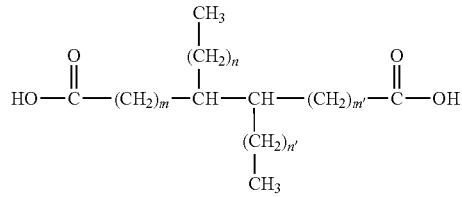

wherein m, m', n, and n' are as defined for formula (9e).

In one aspect, an aliphatic dicarboxylic acid of formula (9g) can be derived from the addition reaction of two unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic dicarboxylic acid, the cis isomer, trans isomer, or a combination of cis and trans isomers can be present within reactant unsaturated aliphatic acid (such as where a single aliphatic dicarboxylic acid can have at least one each of a cis and trans isomerized double bond), or different isomers of unsaturated aliphatic acids may be combined (such as where a combination of a trans aliphatic acid and a cis aliphatic acid is used). Aliphatic acids that can be reacted to form the aliphatic dicarboxylic acid can include C3-37 unsaturated acids, specifically C4-30 unsaturated acids, more specifically C6-22 unsaturated acids, and still more specifically C12-22 unsaturated acids, provided the combined number of carbons in the reacted unsaturated acids is selected such that the resulting aliphatic dicarboxylic acid is a C14-44 diacid.

In an exemplary aspect, a useful aliphatic dicarboxylic acid is a C36 aliphatic dicarboxylic acid that can be obtained from the reaction of two C18 unsaturated acids, such as oleic acid, linoleic acid, or a combination thereof. In still further aspect, a useful aliphatic dicarboxylic acid is a C44 aliphatic dicarboxylic acid. In a yet further aspect, a C44 aliphatic dicarboxylic acid can be prepared by dimerization of erucic acid (C22). Exemplary diacids according to the invention are hydrogenated dimeric fatty acids, such as, for example, Pripol® 1009 which is a is a mixture of hydrogenated dimer fatty acids available from Uniqema.

Thus, in an exemplary aspect, the polyester-polycarbonate comprises ester units derived from a C6-44 aliphatic dicarboxylic acid or derivative thereof, and a carbonate unit derived from a 2-hydrocarbyl-3,3-bis(4-hydroxyaryl)phthalimidine (PPPBP). In a further aspect, the polyester-polycarbonate comprises ester units derived from a C6-44 aliphatic dicarboxylic acid or derivative thereof, and a carbonate unit derived from dihydroxyaromatic compound, where the dihydroxyaromatic compound and the 2-hydrocarbyl-3,3-bis(4-hydroxyaryl)phthalimidine are not identical. In a still further aspect, the C6-44 aliphatic dicarboxylic acid comprises sebacic acid, dodecanedioic acid, hexadecanedioic acid, a C36 aliphatic dicarboxylic acid (C36 diacid), or a combination thereof.

As noted above, in addition to homopolymers, the polycarbonates of the invention can include co-polycarbonates comprising repeating carbonate units derived from two or more aromatic dihydroxy monomers. According to various aspects, the polycarbonates can be formulated to provide any desired relative mole ratio of repeating carbonate units within the chain of co-polycarbonates. Similarly, according to other aspects where the polycarbonate is a poly(ester carbonate), comprising repeating units derived from at least one aromatic dihydroxy monomer and repeating ester unit derived from at least one dicarboxylic acid monomer, the poly(ester carbonate) can be formulated to provide any desired mole ratio of repeating carbonate units relative to repeating ester units within the poly(ester carbonate) chain. Still further, in other aspects where the polycarbonate is a co-(polyester carbonate) comprising repeating ester units derived from two or more dicarboxylic acid monomers, the polycarbonates can be formulated to provide any desired relative mole ratio of repeating ester units within the co-polyester carbonate chain.

In other aspects, the relative mole ratio among the various monomeric components present in a copolymer will depend, in part, upon the total number of differing monomeric components present. The mole ratios can be expressed as relative mole percentages whereby the total mole percentage of monomeric components adds up to 100 mole %. For example, a copolymer comprising a first aromatic dihydroxy monomer and a second aromatic dihydroxy monomer can be provided wherein the relative mole percentage ratio of the first monomer to the second monomer is 90 mole % to 10 mole %, 80 mole % to 20 mole %, 75 mole % to 25 mole %, 70 mole % to 30 mole %, 60 mole % to 40 mole %, or even 50 mole % to 50 mole %.

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide (OH), superoxide ($O^{2-}$), thiolate ($HS^-$), sulfide ($S^{2-}$), a C1-20 alkoxide, a C6-20 aryloxide, a C1-20 carboxylate, a phosphate including biphosphate, a C1-20 phosphonate, a sulfate including bisulfate, sulfites including bisulfites and metabisulfites, a C1-20 sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediaminetetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 µmol. In an aspect, the amount of alpha catalyst can be about 0.01 to about 20 µmol, specifically about 0.1 to about 10 µmol, more specifically about 0.5 to about 9 µmol, and still more specifically about 1 to about 7 µmol, per mole of aliphatic diol and any other dihydroxy compound present in the melt polymerization.

In another aspect, a second type of transesterification catalyst, also referred to herein as a beta catalyst, can be included as the catalyst or in combination with the alpha catalyst in the melt polymerization process, provided that the inclusion of such a second transesterification catalyst does not significantly adversely affect the desirable properties of the polycarbonate. Exemplary transesterification catalysts can further include a combination of catalysts of formula $(R^3)_4Q^+X$ above, wherein each $R^3$ is the same or different, and is a C1-10 alkyl group; Q is a nitrogen or phosphorus atom; and X is a halogen atom or a C1-8 alkoxy group or C6-18 aryloxy group. Exemplary salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a C1-8 alkoxy group or a C6-18 aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (I.e., phenyl compounds having a single free hydroxy group), monocarboxylic acid chlorides, and/or monochloroformates. Phenolic chain-stoppers are exemplified by phenol and C1-22 alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including a polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In addition to the polycarbonate, the composition can include various additives ordinarily incorporated in resin compositions of this type, with the proviso that the additives are selected so as to not significantly adversely affect the desired properties of thermoplastic composition. Combinations of additives can be used. Such additives can be mixed at a suitable time during the mixing of the components for forming the composition.

In other aspects, a polycarbonate composition can comprise one or more of an antioxidant, for instance, phosphorous containing stabilizers and hindered phenols, flame retardant, heat stabilizer, light stabilizer, UV absorbing additive, plasticizer, lubricant, mold release agent, antistatic agent, colorant (e.g., pigment and/or dye), or a combination thereof.

The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some aspects the melt processed composition exits processing equipment such as an extruder through small exit holes in a die. The resulting strands of molten resin are cooled by passing the strands through a water bath. The cooled strands can be chopped into small pellets for packaging and further handling.

Thermoplastic compositions comprising blended polycarbonate compositions can be manufactured by various methods. For example, powdered polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Sulfone Monomer

In various aspects, sulfone polymers are high performance amorphous thermoplastic engineering resins that contain the characteristic diaryl sulfone linkage. Sulfone polymers are known for their high mechanical strength, thermal and oxidative resistance, resistance to hydrolysis, and to many acids, bases, and solvents.

As used herein, the term "sulfone" refers to an oligomer or polymer comprising structural units of one or more sulfonyl containing compounds joined by ether linkages.

In various aspects, the polycarbonate compositions of the present invention comprise a sulfone unit.

In one aspect, the sulfone structural unit can be derived from sulfonyl-containing dihydroxy compounds (also referred to herein as "hydroxyaryl end-capped polysulfones") of formula (10):

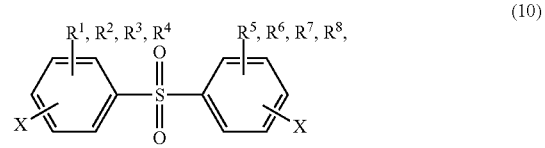

wherein $R^1$-$R^8$ are each independently selected from hydrogen, halogen, nitro, cyano, $C^1$-$C^{20}$ alkyl, $C^4$-$C^{20}$ cycloalkyl, and $C^6$-$C^{20}$ aryl; and wherein each X is independently halide or —OH. In a further aspect, each X is the same moiety, that is, both are either halide or —OH. In a still further aspect, each X is halide. In a yet further aspect, each X is —Cl. In an even further aspect, each X is —OH. An exemplary compound of formula (10) is 4,4'-dichlorodiphenylsulphone.

In another aspect, the sulfone structural unit can further comprise thioether-containing dihydroxy compounds derived from formula (11)

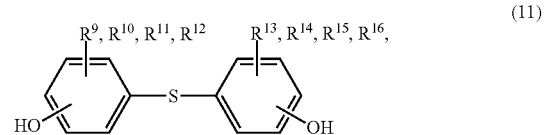

wherein $R^9$-$R^{16}$ are each independently selected from hydrogen, halogen, nitro, cyano, $C^1$-$C^{20}$ alkyl, $C^4$-$C^{20}$ cycloalkyl, and $C_6$-$C_{20}$ aryl. An exemplary compound of formula (11) is 4,4'-thiodiphenol (TDP).

For the structures above, R″ is understood to represent four independent substituents for each ring structure and location. By "independent substituents," it is meant that each R substituent can be independently defined and located. For example, if in one instance $R^1$ is halogen, then $R^2$ is not necessarily halogen in that instance.

In a further aspect, the sulfone unit comprises structural units of formula (12):

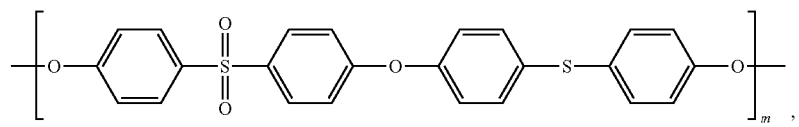

wherein m can be 3 to 10. In a still further aspect, m is 4-9. In a yet further aspect, m is 4-8. In an even further aspect, m is 4-7. In a still further aspect, m is 4-6. In a yet further aspect, m is 3-9. In an even further aspect, m is 3-8. In a still even further aspect, m is 3-7. In a yet further aspect, m is 3-6. Thus, in one aspect, the sulfone units of formula (12) comprises sulfone subunits derived from the reaction of 4,4'-dichlorodiphenylsulfone and 4,4'-thiodiphenol.

Methods of Manufacture

In various aspects, the polycarbonate copolymer composition of the present invention can be prepared by melt polymerization methods.

In one aspect, the invention pertains to methods for the manufacture of a polycarbonate composition, comprising: (a) providing a diaryl sulfone; (b) providing a phenolic monomer; (c) reacting the diaryl sulfone and the phenolic monomer under conditions effective to provide sulfone unit comprising structural units of formula:

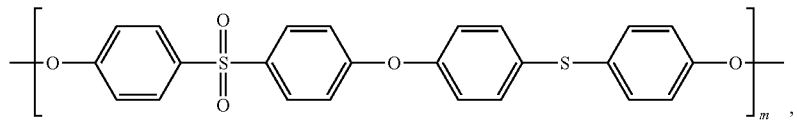

wherein m can be 3 to 10; (d) providing a polycarbonate; and (e) reacting the sulfone of (c) and polycarbonate under conditions effective to provide a copolymer composition; wherein the copolymer composition exhibits a glass transition temperature of at least about 133° C.; and wherein the copolymer composition exhibits a refractive index of at least about 1.59.

In various further aspects, the invention pertains to methods for the manufacture of a polycarbonate composition, comprising: (a) providing a diaryl sulfone; (b) providing a phenolic monomer; (c) reacting the diaryl sulfone and the phenolic monomer under conditions effective to provide a monomeric sulfone unit comprising structural units derived from formulas (i) and (ii):

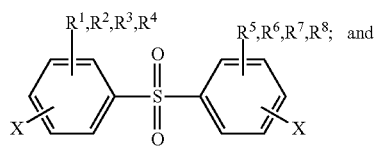

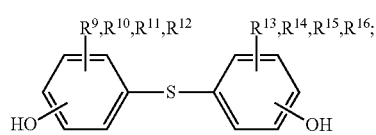

wherein $R^1$-$R^{16}$ are each independently selected from hydrogen, halogen, nitro, cyano, $C^1$-$C^{20}$ alkyl, $C^4$-$C^{20}$ cycloalkyl, and $C^6$-$C^{20}$ aryl; and wherein each X is independently halide or —OH; (d) providing a polycarbonate; and (e) reacting the sulfone of (c) and polycarbonate under conditions effective to provide a copolymer composition; wherein the copolymer composition exhibits a glass transition temperature of at least about 133° C.; and wherein the copolymer composition exhibits a refractive index of at least about 1.59.

In one aspect, the invention pertains to methods for the manufacture of a polycarbonate composition, comprising: (a) providing monomeric units comprising a carbonate unit derived from a first aromatic dihydroxy compound; (b) providing monomeric sulfone units derived from formulas (i) and (ii):

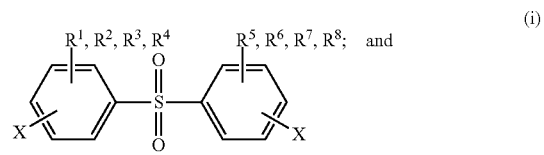

-continued

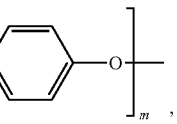

wherein $R^1$-$R^{16}$ are each independently selected from hydrogen, halogen, nitro, cyano, $C^1$-$C^{20}$ alkyl, $C^4$-$C^{20}$ cycloalkyl, and $C^6$-$C^{20}$ aryl; and wherein each X is independently halide or —OH; (c) optionally providing a carbonate unit derived from a second aromatic dihydroxy compound; (d) optionally providing an aromatic diol or aliphatic dicarboxylic acid; and (e) reacting under conditions effective to provide a copolymer composition; wherein the copolymer composition exhibits a glass transition temperature of at least about 133° C.; and wherein the copolymer composition exhibits a refractive index of at least about 1.59.

Properties

According to some aspects, the polycarbonate copolymer composition can be characterized as having respective molar weight ratios of about 10 mol % to about 75 mol % of aromatic dihydroxy units; and about 10 mol % to about 90 mol % of sulfone units, wherein the mol % of aromatic dihydroxy monomer units, and sulfone units combined is 100 mol %. In a further aspect, the polycarbonate copolymer composition can be characterized as having respective molar weight ratios of about 15 mol % to about 50 mol % of aromatic dihydroxy units; and about 25 mol % to about 85 mol % of sulfone units, wherein the mol % of aromatic dihydroxy monomer units, and sulfone units combined is 100 mol %.

In a further aspect, the molar weight ratios aromatic dihydroxy units can comprise any value between the foregoing values, for example, 15, 20, 25, 30, 35, 40, 45, 50, 55, 60, 65, or 70 mol %, wherein the mol % of aromatic dihydroxy units, and sulfone units combined is 100 mol %. In a still further aspect, the molar weight ratios sulfone units can comprise any value between the foregoing values, for example, 15, 20, 25, 30, 35, 40, 45, 50, 55, 60, 65, 70, 75, 80, or 85 mol %, wherein the mol % of aromatic dihydroxy monomer units, and sulfone units combined is 100 mol %.

In alternative aspects, the polycarbonate copolymer composition can be characterized as having respective molar weight ratios of about 10 mol % to about 75 mol % of a first aromatic dihydroxy units; about 10 mol % to about 90 mol % of sulfone units; and about 10 mol % to about 75 mol % of a second aromatic dihydroxy units, wherein the mol % of a first aromatic dihydroxy monomer units, sulfone units, and a second aromatic dihydroxy monomer units combined is 100 mol %. In a further aspect, the polycarbonate copolymer composition can be characterized as having respective molar weight ratios of about 15 mol % to about 50 mol % of aromatic dihydroxy units; about 25 mol % to about 85 mol % of sulfone units; and a second about 15 mol % to about 50 mol % of aromatic dihydroxy units, wherein the mol % of first aromatic dihydroxy monomer units, sulfone units, and second aromatic dihydroxy units combined is 100 mol %.

In a further aspect, the molar weight ratios of the first aromatic dihydroxy units can comprise any value between the foregoing values, for example, 15, 20, 25, 30, 35, 40, 45, 50, 55, 60, 65, or 70 mol %, wherein the mol % of first aromatic dihydroxy units, sulfone units, and second aromatic dihydroxy units combined is 100 mol %. In a still further aspect, the molar weight ratios sulfone units can comprise any value between the foregoing values, for example, 15, 20, 25, 30, 35, 40, 45, 50, 55, 60, 65, 70, 75, 80, or 85 mol %, wherein the mol % of the first aromatic dihydroxy monomer units, sulfone units, and second aromatic dihydroxy units combined is 100 mol %. In a yet further aspect, the molar weight ratios of the second aromatic dihydroxy units can comprise any value between the foregoing values, for example, 15, 20, 25, 30, 35, 40, 45, 50, 55, 60, 65, or 70 mol %, wherein the mol % of first aromatic dihydroxy units, sulfone units, and second aromatic dihydroxy units combined is 100 mol %.

In other aspects, the polycarbonate copolymer composition can be characterized as having respective molar weight ratios of about 10 mol % to about 75 mol % of a first aromatic dihydroxy units; about 10 mol % to about 90 mol % of sulfone units; about 10 mol % to about 75 mol % of a second aromatic dihydroxy units; and about 1 mol % to about 25 mol % of ester units, wherein the mol % of a first aromatic dihydroxy monomer units, sulfone units, a second aromatic dihydroxy monomer units and ester units combined is 100 mol %. In a further aspect, the polycarbonate copolymer composition can be characterized as having respective molar weight ratios of about 15 mol % to about 50 mol % of aromatic dihydroxy units; about 25 mol % to about 85 mol % of sulfone units; a second about 15 mol % to about 50 mol % of aromatic dihydroxy units; and about 5 mol % to about 15 mol % of ester units, wherein the mol % of first aromatic dihydroxy monomer units, sulfone units, second aromatic dihydroxy units and ester units combined is 100 mol %.

In a further aspect, the molar weight ratios of the first aromatic dihydroxy units can comprise any value between the foregoing values, for example, 15, 20, 25, 30, 35, 40, 45, 50, 55, 60, 65, or 70 mol %, wherein the mol % of first aromatic dihydroxy monomer units, sulfone units, second aromatic dihydroxy units and ester units combined is 100 mol %. In a still further aspect, the molar weight ratios sulfone units can comprise any value between the foregoing values, for example, 15, 20, 25, 30, 35, 40, 45, 50, 55, 60, 65, 70, 75, 80, or 85 mol %, wherein the mol % of first aromatic dihydroxy monomer units, sulfone units, second aromatic dihydroxy units and ester units combined is 100 mol %. In a yet further aspect, the molar weight ratios of the second aromatic dihydroxy units can comprise any value between the foregoing values, for example, 15, 20, 25, 30, 35, 40, 45, 50, 55, 60, 65, or 70 mol %, wherein the mol % of first aromatic dihydroxy monomer units, sulfone units, second aromatic dihydroxy units and ester units combined is 100 mol %. In an even further aspect, the molar weight ratios of the ester units can comprise any value between the foregoing values, for example, 15, 20, 25, 30, 35, 40, 45, 50, 55, 60, 65, or 70 mol %, wherein the mol % of first aromatic dihydroxy monomer units, polysulfone units, second aromatic dihydroxy units and ester units combined is 100 mol %.

In various aspects, the disclosed polycarbonate copolymer compositions have improved refractive index (RI). In a further aspect, the polycarbonate compositions exhibit a refractive index of at least about 1.59. In a still further aspect, the polycarbonate compositions exhibit a refractive index of at least about 1.62. In a yet further aspect, the polycarbonate copolymer compositions exhibit a refractive index of at least about 1.63. In a still further aspect, the refractive index is at least about 1.64.

In another aspect, the disclosed polycarbonate copolymer compositions have improved thermal dimensional stability. In a further aspect, the disclosed polycarbonate copolymer compositions exhibit a glass transition temperature (Tg) from about 115° C. to about 180° C. In a still further aspect, the disclosed polycarbonate copolymer compositions exhibit a glass transition temperature (Tg) from about 133° C. to about 178° C. In a yet further aspect, the disclosed polycarbonate copolymer compositions exhibit any glass transition temperature (Tg) between the foregoing values, for example, 125, 130, 135, 140, 145, 150, 160, 170, 175, or 178° C.

In another aspect, the disclosed polycarbonate copolymer compositions have improved hydrolytic stability. In a further aspect, the hydrolytic stability is determined in a hydrolytic aging chamber for at least 500 hours at temperature from about 70° C. to about 90° C. with a relative humidity from about 60% to about 95%. In a still further aspect, the hydrolytic stability is determined in a hydrolytic aging chamber for at least 750 hours at temperature from about 70° C. to about 90° C. with a relative humidity from about 60% to about 95%. In a yet further aspect, the hydrolytic stability is determined in a hydrolytic aging chamber for at least 1000 hours at temperature from about 70° C. to about 90° C. with a relative humidity from about 60% to about 95%. In an even further aspect, the hydrolytic stability is determined in a hydrolytic aging chamber for 1000 hours at temperature of about 85° C. with a relative humidity of about 85%.

In a further aspect, disclosed polycarbonate copolymer compositions exhibit a hydrolytic stability with substantially the same weight average molecular weight retention than that of a reference polycarbonate composition when the hydrolytic stability is determined in a hydrolytic aging chamber for 1000 hours at temperature of about 85° C. with a relative humidity of about 85%. In a still further aspect, the reference polycarbonate composition comprises XHT.

In a further aspect, disclosed polycarbonate copolymer compositions exhibit a hydrolytic stability with at least 10% greater weight average molecular weight retention than that of a reference polycarbonate composition when the hydrolytic stability is determined in a hydrolytic aging chamber for 1000 hours at temperature of about 85° C. with a relative humidity of about 85%. In a still further aspect, the reference polycarbonate composition comprises XHT.

In a further aspect, disclosed polycarbonate copolymer compositions exhibit a hydrolytic stability with at least 25% greater weight average molecular weight retention than that of a reference polycarbonate composition when the hydrolytic stability is determined in a hydrolytic aging chamber for 1000 hours at temperature of about 85° C. with a relative humidity of about 85%. In a still further aspect, the reference polycarbonate composition comprises XHT.

In various further aspects, the disclosed polycarbonate compositions have improved refractive index, thermal dimensional stability, and hydrolytic stability. In a one aspect, the disclosed polycarbonate compositions exhibits a glass transition temperature of at least about 130° C., a refractive index of at least about 1.59, and a hydrolytic stability with substantially the same weight average molecular weight retention than that of a reference polycarbonate composition when the hydrolytic stability is determined in a hydrolytic aging chamber. In a further aspect, the disclosed polycarbonate compositions exhibits a glass transition temperature of at least about 170° C., a refractive index of at least about 1.62, and a hydrolytic stability with at least 10% greater weight average molecular weight retention than that of a reference XHT polycarbonate composition when the hydrolytic stability is determined in a hydrolytic aging chamber.

Articles

The disclosed polycarbonate compositions can be used in the manufacture of various end use articles and products. The polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming The polycarbonate compositions described herein can also be made into film and sheet as well as components of laminate systems.

In one aspect, the disclosed polycarbonate compositions can be used to manufacture articles for use in electronic, imaging, or optical devices. In a further aspect, the devices can include, for example, mobile phones, mobile computing devices, cameras, video recorders, projectors, corrective lenses, diffusers, or copiers. In a still further aspect, the disclosed composition are useful to form articles for use in devices such as lenses for use in portable electronics applications including cell phones, cameras, personal digital assistants, DVD players and recording devices, and the like.

In another aspect, articles and products made from the disclosed compositions can also be used in a variety of applications including thin-wall articles, where transparency, precision as defined by a high degree of reproducibility, retention of mechanical properties including impact strength, and precise optical properties are required.

In another aspect, the disclosed composition are useful in the manufacture of optical lenses including camera lenses, e.g., for mobile telephone cameras, and for digital still photography cameras; and automotive camera lenses. For applications in which a lens set is required, such as for camera lenses, one or more of these optical lenses may be manufactured using a disclosed composition.

In various aspects, the present invention pertains to and includes at least the following aspects.

Aspect 1: A polycarbonate copolymer composition comprising: (a) monomeric units comprising a carbonate unit derived from a first aromatic dihydroxy compound; (b) monomeric sulfone units comprising units derived from formulas (i) and (ii):

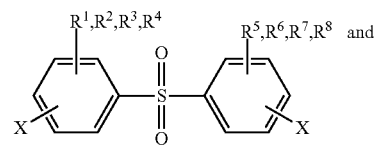

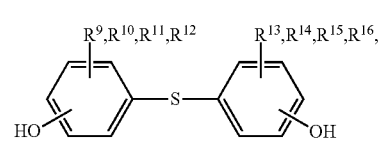

wherein $R^1$-$R^{16}$ are each independently selected from hydrogen, halogen, nitro, cyano, $C^1$-$C^{20}$ alkyl, $C^4$-$C^{20}$ cycloalkyl, and $C^6$-$C^{20}$ aryl; and wherein the weight-averaged molecular weight of the polymer is from about 3,000 to about 80,000; and wherein each X is independently a halide or —OH.

Aspect 2: The composition of aspect 1, wherein formula (1) comprises 4,4'-dichlorodiphenylsulphone.

Aspect 3: The composition of aspect 1 or 2, wherein formula (Ii) comprises 4,4'-thiodiphenol.

Aspect 4: The polycarbonate copolymer composition of any of aspects 1-3, wherein the sulfone units (b) comprises the formula:

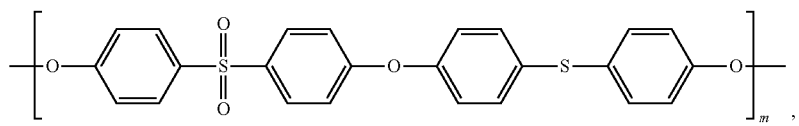

wherein m is 4-7.

Aspect 5: The composition of any of aspects 1-4, further comprising monomeric units (c) comprising a carbonate unit derived from a second aromatic dihydroxy compound.

Aspect 6: The composition of any of aspects 1-5, wherein the monomeric units (a) further comprise a carbonate unit derived from a second aromatic dihydroxy compound.

Aspect 7: The composition of any of aspects 1-6, wherein the carbonate unit is derived from bisphenol A, PPPBP, bisphenol acetophenone or a combination thereof.

Aspect 8: The composition of any of aspects 5-7, wherein the carbonate unit of (a) comprises PPPBP, and wherein the carbonate unit of (c) comprises bisphenol A.

Aspect 9: The composition of any of aspects 5-8, wherein the monomeric units (c) further comprise an ester unit derived from an aromatic diol, a C6-C44 aliphatic dicarboxylic acid, or a derivative thereof.

Aspect 10: The composition of any of aspects 5-9, wherein the monomeric units (c) comprises a polyester-carbonate.

Aspect 11: The composition of aspects 9 or 10, wherein the ester unit is derived from a aliphatic dicarboxylic acid.

Aspect 12: The composition of any of aspects 9-11, wherein the ester unit is derived from a aliphatic dicarboxylic acid of the formula:

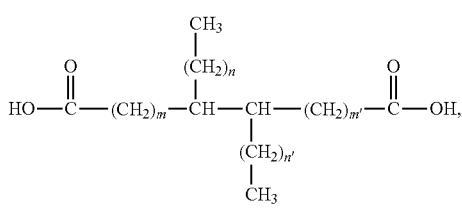

where m and m' are independently 0 to 38, n and n' are independently 0 to 38, and the sum m+m'+n+n' is an integer from 8 to 38.

Aspect 13: The composition of any of aspects 9-12, wherein the aliphatic dicarboxylic acid comprises C36 aliphatic dicarboxylic acid, C44 aliphatic dicarboxylic acid, or a combination thereof.

Aspect 14: The composition of aspect 13, wherein the C36 aliphatic dicarboxylic acid comprises a mixture of hydrogenated dimer fatty acids.

Aspect 15: The composition of any of aspects 1-14, wherein the wherein the bisphenol-A polycarbonate has a weight-averaged molecular weight from about 18,000 to about 32,000.

Aspect 16: The composition of any of aspects 1-14, wherein the bisphenol-A polycarbonate has a weight-averaged molecular weight from about 28,000 to about 32,000.

Aspect 17: The composition of any of aspects 1-16, wherein the composition exhibits a refractive index of at least about 1.59.

Aspect 18: The composition of any of aspects 1-16, wherein the composition exhibits a refractive index of at least about 1.60.

Aspect 19: The composition of any of aspects 1-16, wherein the composition exhibits a refractive index of at least about 1.61.

Aspect 20: The composition of any of aspects 1-16, wherein the composition exhibits a refractive index of at least about 1.62.

Aspect 21: The composition of any of aspects 1-16, wherein the composition exhibits a refractive index of at least about 1.63.

Aspect 22: The composition of any of aspects 1-16, wherein the composition exhibits a refractive index of at least about 1.64.

Aspect 23: The composition of any of aspects 1-22, wherein the composition exhibits a glass transition temperature of at least about 130° C.

Aspect 24: The composition of any of aspects 1-22, wherein the composition exhibits a glass transition temperature of at least about 135° C.

Aspect 25: The composition of any of aspects 1-22, wherein the composition exhibits a glass transition temperature of at least about 140° C.

Aspect 26: The composition of any of aspects 1-22, wherein the composition exhibits a glass transition temperature of at least about 145° C.

Aspect 27: The composition of any of aspects 1-22, wherein the composition exhibits a glass transition temperature of at least about 150° C.

Aspect 28: The composition of any of aspects 1-22, wherein the composition exhibits a glass transition temperature of at least about 155° C.

Aspect 29: The composition of any of aspects 1-22, wherein the composition exhibits a glass transition temperature of at least about 160° C.

Aspect 30: The composition of any of aspects 1-22, wherein the composition exhibits a glass transition temperature of at least about 165° C.

Aspect 31: The composition of any of aspects 1-22, wherein the composition exhibits a glass transition temperature of at least about 170° C.

Aspect 32: The composition of any of aspects 1-22, wherein the composition exhibits a glass transition temperature of at least about 175° C.

Aspect 33: The composition of any of aspects 1-22, wherein the composition exhibits a glass transition temperature of at least about 180° C.

Aspect 34: The composition of any of aspects 1-22, wherein the composition exhibits a glass transition temperature of at least about 185° C.

Aspect 35: The composition of any of aspects 1-22, wherein the composition exhibits a glass transition temperature of at least about 133° C.; and wherein the composition exhibits a refractive index of at least about 1.59.

Aspect 36: The composition of any of aspects 1-22, wherein the composition exhibits a glass transition temperature of at least about 140° C.; and wherein the composition exhibits a refractive index of at least about 1.59.

Aspect 37: The composition of any of aspects 1-22, wherein the composition exhibits a glass transition temperature of at least about 150° C.; and wherein the composition exhibits a refractive index of at least about 1.60.

Aspect 38: The composition of any of aspects 1-22, wherein the composition exhibits a glass transition temperature of at least about 160° C.; and wherein the composition exhibits a refractive index of at least about 1.61.

Aspect 39: The composition of any of aspects 1-22, wherein the composition exhibits a glass transition temperature of at least about 170° C.; and wherein the composition exhibits a refractive index of at least about 1.62.

Aspect 40: The composition of any of aspects 1-39, wherein the composition exhibits a hydrolytic stability with substantially the same weight average molecular weight retention than that of a reference polycarbonate composition when the hydrolytic stability is determined in a hydrolytic aging chamber for 1000 hours at temperature of about 85° C. with a relative humidity of about 85%.

Aspect 41: The composition of any of aspects 1-39, wherein the composition exhibits a hydrolytic stability with at least 10% greater weight average molecular weight retention than that of a reference polycarbonate composition when the hydrolytic stability is determined in a hydrolytic aging chamber for 1000 hours at temperature of about 85° C. with a relative humidity of about 85%.

Aspect 42: The composition of any of aspects 1-39, wherein the composition exhibits a hydrolytic stability with at least 25% greater weight average molecular weight retention than that of a reference polycarbonate composition when the hydrolytic stability is determined in a hydrolytic aging chamber for 1000 hours at temperature of about 85° C. with a relative humidity of about 85%.

Aspect 43: The composition of aspect 40-42, wherein the reference polycarbonate composition comprises XHT.

Aspect 44: The composition of any of aspects 1-43, wherein the composition exhibits a glass transition temperature of at least about 130° C., a refractive index of at least about 1.59, and a hydrolytic stability with substantially the same weight average molecular weight retention than that of a reference polycarbonate composition when the hydrolytic stability is determined in a hydrolytic aging chamber.

Aspect 45: The composition of any of aspects 1-43, wherein the composition exhibits a glass transition temperature of at least about 170° C., a refractive index of at least about 1.62, and a hydrolytic stability with at least 10% greater weight average molecular weight retention than that of a reference XHT polycarbonate composition when the hydrolytic stability is determined in a hydrolytic aging chamber.

Aspect 46: The composition of aspect 1, wherein the composition has respective molar weight ratios of about 10 mol % to about 75 mol % of carbonate units (a); and about 10 mol % to about 90 mol % of sulfone units (b); wherein the mol % of carbonate units (a) and sulfone units (b) combined is 100 mol %.

Aspect 47: The composition of aspect 5, wherein the composition has respective molar weight ratios of about 10 mol % to about 75 mol % of carbonate units (a); about 10 mol % to about 90 mol % of sulfone units (b); and about 10 mol % to about 75 mol % of carbonate units (c), wherein the mol % of a carbonate units (a), sulfone units (b), and carbonate units (c) combined is 100 mol %.

Aspect 48: The composition of aspect 9, wherein the composition has respective molar weight ratios of about 10 mol % to about 75 mol % of carbonate units (a); about 10 mol % to about 90 mol % of sulfone units (b); about 10 mol % to about 75 mol % of carbonate units (c); and about 1 mol % to about 25 mol % of ester units, wherein the mol % of carbonate units (a), sulfone units (b), carbonate units (c) and ester units combined is 100 mol %.

Aspect 49: The composition of any of aspects 1-45, wherein the carbonate unit (a) is present in the composition as a total amount from about 10 mol % to about 80 mol %.

Aspect 50: The composition of aspect 1, wherein the sulfone unit (b) is present in the composition as a total amount from about 10 mol % to about 90 mol %.

Aspect 51: The composition of aspect 5, wherein the carbonate unit (a) is present in the composition as a total amount from about 10 mol % to about 80 mol %.

Aspect 52: The composition of aspect 9, wherein the ester unit is present in the composition as a total amount from about 1 mol % to about 25 mol %.

Aspect 53: The composition of any of aspects 1-52, wherein the composition further comprises at least one additive selected from thermal stabilizers, antioxidants, UV stabilizers, plasticizers, visual effect enhancers, extenders, antistatic agents, catalyst quenchers, mold releasing agents, fire retardants, blowing agents, impact modifiers and processing aids.

Aspect 54: An article of manufacture formed from the composition of any of aspects 1-53 or aspects 59-61.

Aspect 55: The article of aspect 54, wherein the article is an extruded film or sheet.

Aspect 56: The article of aspect 54, wherein the article is injection molded.

Aspect 57: The article of any of aspects 54-56, wherein the article is a component for an electronic, imaging, or optical device.

Aspect 58: The article of aspect 55, wherein the device is selected from a mobile phone, a mobile computing device, a camera, a video recorder, a projector, corrective lenses, a diffuser, or a copier.

Aspect 59: A polycarbonate copolymer composition comprising: (a) a carbonate unit comprising 2-hydrocarbyl-3,3-bis(4-hydroxyaryl)phthalimidine (PPPBP); (b) a sulfone unit comprising a compound having the formula:

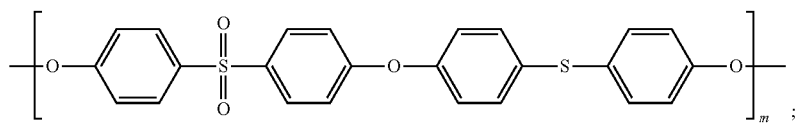

And a carbonate unit comprising bisphenol A.

Aspect 60: The composition of aspect 59, wherein the carbonate unit (c) further comprises a C6-C44 aliphatic dicarboxylic acid ester unit.

Aspect 61: A method for the manufacture of a polycarbonate composition, comprising: (a) providing a diaryl sulfone; (b) providing a phenolic monomer; and (c) reacting the diaryl sulfone and the phenolic monomer under conditions effective to provide a monomeric sulfone unit comprising structural units derived from formulas (i) and (ii):

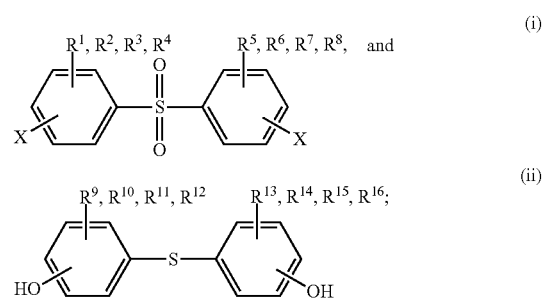

wherein $R^1$-$R^{16}$ are each independently selected from hydrogen, halogen, nitro, cyano, $C^1$-$C^{20}$ alkyl, $C^4$-$C^{20}$ cycloalkyl, and $C^6$-$C^{20}$ aryl; and wherein each X is independently halide or —OH; (d) providing a polycarbonate; (e) reacting the sulfone of (c) and polycarbonate under conditions effective to provide a copolymer composition; wherein the copolymer composition exhibits a glass transition temperature of at least about 133° C.; and wherein the copolymer composition exhibits a refractive index of at least about 1.59.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric. Unless indicated otherwise, percentages referring to composition are in terms of wt %. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Refractive index ("RI") was determined using polymer film samples of 80-100 nm. A Filmetrics® F20 was used to measure thickness and optical constants of the thin film samples based on a coating method. The polymer sample was dissolved in chloroform and a thin film was cast on a silicon wafer. An approximate RI value was entered in the software for calculation of theoretical reflectance of the coating in the visible region. The actual reflectance was then measured and the software overlaps the theoretical curve with the actual curve to provide a goodness of fit. The recorded data always reflects a GOF of 0.999. The actual reflectance curve was then used to calculate the RI and thickness of the film. Data below are provided for RI.

Glass transition temperature ("Tg") was determined by differential scanning calorimetry ("DSC") run at a temperature ramp rate of 20° C./min in air. Data are provided below in ° C.

Samples from the batches were subjected to hydrolytic stress by placement in a hydrolytic chamber for 1600 hours at 85° C. and 85% relative humidity ("RH"). Hydrolytic stability was assessed by comparison of the weight average molecular weight ("Mw"), number average molecular weight ("Mn"), and polydispersity ("PDI") of samples before and after hydrolytic stress (85% relative humidity at 80° C.) for varied periods of time (15 and 65 days). The data are shown in Table 3 below. Data were obtained by gel permeation chromatography (GPC) as using polystyrene standards.

For the following non-limiting Examples, sample copolymer compositions were prepared from the components described in Table 1 below. The novel copolymer compositions described in Table 5 were synthesized by interfacial polycondensation route using triphosgene as a carbonate source or melt reactive process using bis(methyl salicyl) carbonate as a carbonate source. The comparative examples, CE1, CE2, and CE3, are, respectively, PC105 (a BPA polycarbonate), TDP (a homopolycarbonate), and XHT (a PPPBP/BPA copolycarbonate comprising 33 mol % PPPBP).

TABLE 1

| Item | Description | Supplier |
|---|---|---|
| DCDPS | 4,4'-dichlorodiphenylsulfone | Aldrich |
| TDP | 4,4'-thiodiphenol | Aldrich |
| $K_2CO_3$ | Potassium carbonate | Merck |
| DMAc | Dimethylacetamide | Aldrich |
| BPA | Bisphenol A polycarbonate | SABIC Innovative Plastics ("SABIC IP") |
| PPPBP | 2-phenyl-3,3-bis(4-hydroxyphenyl)-phthalimide | SABIC IP |
| Pripol ® 1009 | Dimer acid hydrogenated (Polymerized fatty acid) | Uniqema |
| Triphosgene | Carbonate source | Aldrich |
| TEBACl | Triethylbenzylammoniumchloride | Aldrich |
| TEA | Triethylamine | Aldrich |
| BMSC | Bis methylsalicyl carbonate | SABIC IP |
| TMAH | Tetramethyl ammonium hydroxide | SACHEM Inc., USA |
| NaOH | Sodium hydroxide | Merck |

Example 1

Composition E1

Example 1 shows the synthesis of an oligomer/co-monomer based on 4,4'-dichlorodiphenylsulfone (DCDPS) and 4,4'-thiodiphenol (TDP). A 500 ml reaction assembly was purged with nitrogen, then 150 ml of N,N'-dimethylacetamide (DMAc) was added along with TDP (22.8 g, 0.1 mole) and DCDPS (23.88 g, 0.083 mole). 75 ml of toluene was then added to the reaction mixture. The reaction mixture was stirred vigorously with a constant purge of nitrogen and heated to reflux. The reaction was maintained at reflux until no more water droplets from the reaction were observed. Toluene was continuously removed from the trap until the temperature rose to about 155° C. This process requires approximately 5 hours, at which time the refluxing is discontinued and the reaction mixture was allowed to continue to stir at room temperature for approximately 10-12 hours. After this period the reaction is assumed to be complete, the mixture is filtered to remove formed salts, and then precipitated using a methanol:water (50:50) mixture solution. The precipitated oligomer is filtered, dried and then stirred in warm water to remove any trapped salt particles. The washed oligomer was then filtered and finally dried. The molecular weight of the resulting oligomer was found to be 5950 (Mw) and 1843 (Mn).

Example 2

Compositions E2 and E3

Example 2 shows an exemplary interfacial polymerization process using the TDP-sulfone oligomer of Example 1 with other diols as described herein. The polymerization process of TDP-sulfone oligomer with BPA and/or PPPBP was carried out using triphosgene as a carbonate source to provide compositions E2 and E3, respectively. The reaction was performed using a glass-apparatus set-up placed inside a fumehood equipped with exhaust facilities. The set-up consisted of a 4-necked round-bottom flask fitted with two dropping funnels and a mechanical stirrer. The flask was charged with TDP-sulfone oligomer, water (100 ml), dichloromethane (100 ml), and triethylbenzylammonium chloride and the contents were stirred at 525 rpm at room temperature under nitrogen blanket. To the stirred slurry, a solution of triphosgene in dichloromethane (50 ml) and an aqueous sodium hydroxide solution (30%, 15 g of NaOH in 50 ml of water) were added drop-wise through separate dropping funnels, for a period of 15-20 minutes. While the entire amount of triphosgene was added during this period, only enough NaOH was added drop wise to maintain the pH of the reaction mixture at about 5-6. After stirring the resultant slurry for another 30 minutes under nitrogen atmosphere, the pH was raised to approximately 10-11 using NaOH. To this stirred slurry, triethylamine in dichloromethane (5 ml) and p-cumyl phenol were added and the pH of the reaction mixture was raised further to about 12 using NaOH. 30 ml of dichloromethane was added to the slurry to avoid a sudden increase of viscosity, and the reaction mixture was stirred for an additional 10 minutes.

Completion of the reaction was determined based on the increased viscosity of the organic layer and termination of exothermic frothing from the evaporation of DCM. At the reaction completion the aqueous layer was decanted, the dichloromethane layer was thoroughly washed with dilute HCl (1N), then washed with water and dried over anhydrous sodium sulfate. The polycarbonate, obtained by precipitating the above dichloromethane solution in methanol with stirring, was filtered and air-dried overnight. The polycarbonate was subsequently dried in a vacuum oven at 65° C. for 6 hours to remove residual solvents, yielding a white fluffy solid polymer.

Example 3

Compositions E4-E8

Reactions were carried out with TDP and different amounts of comonomer (PPPBP and C36 diacid). In general the amount of comonomer employed is expressed in terms of its mole percentage. Mole percentage (mole %) as used herein is defined as:

$$\text{Mole percentage (mole \%)} = 100 \times \frac{\text{Comonomer moles}}{\text{Monomer total moles}}$$

A slight excess of bismethylsalicylate (bMSC), meaning that the amount of bMSC expressed in moles was slightly greater than the stoichiometric amount required to effect complete reaction between all of the comonomers under ideal conditions. In the Examples which follow the melt polymerization catalyst was tetramethylammonium hydroxide (TMAH) in combination with sodium hydroxide. Catalysts were added as aqueous solutions, the volume added being about 100 microliters (μl). The melt polymerizations were carried out in a standard laboratory melt reactor constructed of glass and equipped for stirring a viscous melt and adapted for removal of volatile reaction by-products, for example methyl salicylate or phenol, at ambient or subambient pressure. The reactor was purged with nitrogen after being charged with reactants. The catalyst was added following the nitrogen purge. Upon completion of the melt polymerization reaction, the reactor was brought back to atmospheric pressure with a gentle nitrogen flow, and the polymer was recovered.

Composition E4: The exemplary composition was prepared by an exemplary melt polymerization process. Briefly, a 200 liter stainless steel stirred tank reactor was charged with BMSC (48099 gram), PPPBP (22138 gram), BPA (8841 gram), TDP (7685 gram), pripol 1009 (5989 gram) and PCP (813 gram). An aqueous catalyst solution of sodium hydroxide (NaOH) and Tetra Methyl Ammonium Hydroxide (TMAH) was added to the reactor. Catalyst amounts are $25 \times 10^{-6}$ mol TMAH per mol diol and $8 \times 10^{-6}$ mol NaOH per mol diol. The reactor was then evacuated and purged with nitrogen three times to remove residual oxygen and then put to a constant pressure of 800 mbar. The reactor was then heated to 180° C. in order to melt the monomers and to start the oligomerisation reaction. The reaction is exotherme, which will cause that the temperature of the oligomer will increase above the set point of the oil temperature. When the exotherme peak starts the oil-temperature is reduced to 160° C. After the exotherme peak the molten reaction mixture was fed through a 170° C. heated feed-line to a flash devolatilisation system at a rate of 20 kg/hr. The flash devolatilisation system consists of a pre-heater and a flash vessel. The pre-heater is operated at approximately 220° C. and 250 mbar, the flash vessel is operated at 200° C. and 100 mbar. The polymer at the exit of the flash vessel contains ~2 wt % MS. Under the flash vessel there is a melt pump which transfers the material to the extruder. The extruder was a Werner & Pfleiderer ZSK25WLE 25 mm 13-barrel twin-screw extruder with an L/D=59. The reaction mixture was reactively extruded at a 300-rpm screw speed. The extruder barrels were set to 270° C. and the die was set to 280° C. The extruder was equipped with five forward vacuum vents and one back-vent. The extruder has one vacuum systems called hi-vac, all the vent are connected to this system and have a vacuum of ~1 mbar The methyl salicylate byproduct is removed via devolatilization through these vents. Collected at the end of the extruder through a die are molten strands of polymer that are solidified through a water bath and pelletized.

Composition E5: The exemplary composition was prepared by an exemplary melt polymerization process. Briefly, a 200 liter stainless steel stirred tank reactor was charged with BMSC (48455 gram), PPPBP (16727 gram), BPA (12955 gram), TDP (7742 gram), pripol 1009 (4022 gram) and PCP (820 gram). An aqueous catalyst solution of sodium hydroxide (NaOH) and Tetra Methyl Ammonium Hydroxide (TMAH) was added to the reactor. Catalyst amounts are $25 \times 10^{-6}$ mol TMAH per mol diol and $8 \times 10^{-6}$ mol NaOH per mol diol. The reactor was then evacuated and purged with nitrogen three times to remove residual oxygen and then put to a constant pressure of 800 mbar. The reactor was then heated to 180° C. in order to melt the monomers and to start the oligomerisation reaction. The reaction is exotherme, which will cause that the temperature of the oligomer will increase above the set point of the oil temperature. When the exotherme peak starts the oil-temperature is reduced to 160° C. After the exotherme peak the molten reaction mixture was fed through a 170° C. heated feed-line to a flash devolatilization system at a rate of 20 kg/hr. The flash devolatilization system consists of a pre-heater and a flash vessel. The pre-heater is operated at approximately 220° C. and 250 mbar, the flash vessel is operated at 200° C. and 100 mbar. The polymer at the exit of the flash vessel contains ~2 wt % MS. Under the flash vessel there is a melt pump which transfers the material to the extruder. The extruder was a Werner & Pfleiderer ZSK25WLE 25 mm 13-barrel twin-screw extruder with an L/D=59. The reaction mixture was reactively extruded at a 300-rpm screw speed. The extruder barrels were set to 270° C. and the die was set to 280° C. The extruder was equipped with five forward vacuum vents and one back-vent. The extruder has one vacuum systems called hi-vac, all the vent are connected to this system and have a vacuum of ~1 mbar The methyl salicylate byproduct is removed via devolitalization through these vents. Collected at the end of the extruder through a die are molten strands of polymer that are solidified through a water bath and pelletized.

Composition E6: The exemplary composition was prepared by an exemplary melt polymerization process. Briefly, the melt reactor was passivated by acid washing, rinsing and drying with nitrogen gas, and charged with 8.51 g of TDP, 7.07 g of PPPBP, 1.70 g of C36 diacid, 20.00 g of bMSC, and 100 µl of an aqueous solution of TMAH and NaOH in an amount corresponding to about 25 µmol TMAH and 2 µmol NaOH per the total number of moles of TDP, PPPBP and C36 diacid combined. After nitrogen purging of the reactor system, the temperature-pressure regime used to carry out the melt polymerization comprised the steps of heating for the indicated time periods at the indicated temperatures and pressures shown in Table 2 below. During the different steps, methyl salicylate by-product was removed from the reaction mixture by distillation. Torque build up during polymerization was observed. After the final reaction stage, the reactor was brought back to atmospheric pressure with a gentle nitrogen flow, and the product copolycarbonate was recovered and analyzed. The product copolycarbonate had a yellowish color. The sample was submitted for refractive index measurement (1.628) and the birefringence was determined (16).

TABLE 2

| step | time (minutes) | temp (° C.) | pressure (mbar) |
| --- | --- | --- | --- |
| 1 | 10 | 220 | atm* |
| 2 | 5 | 230 | atm |
| 3 | 30 | 230 | 500 |
| 4 | 5 | 270 | 500 |
| 5 | 10 | 300 | 0.5-1 |

*"atm" is ambient atmospheric pressure.

Composition E7: The exemplary composition was prepared by an exemplary melt polymerization process. Briefly, the melt reactor was passivated by acid washing, rinsing and drying with nitrogen gas, and charged with 11.12 g of TDP, 3.53 g of PPPBP, 20.00 g of bMSC, and 100 µl of an aqueous solution of TMAH and NaOH in an amount corresponding to about 25 µmol TMAH and 2 µmol NaOH per the total number of moles of TDP and PPPBP combined. After nitrogen purging of the reactor system, the temperature-pressure regime used to carry out the melt polymerization comprised the steps of heating for the indicated time periods at the indicated temperatures and pressures shown in Table 3 below. During the different steps, methyl salicylate by-product was removed from the reaction mixture by distillation. Torque build up during polymerization was observed. After the final reaction stage, the reactor was brought back to atmospheric pressure with a gentle nitrogen flow, and the product copolycarbonate was recovered and analyzed. The product copolycarbonate had a yellowish color. The sample was submitted for refractive index measurement (1.638) and the birefringence was determined (19).

TABLE 3

| step | time (minutes) | temp (° C.) | pressure (mbar) |
| --- | --- | --- | --- |
| 1 | 10 | 200 | atm* |
| 2 | 5 | 220 | atm |
| 3 | 30 | 220 | 500 |
| 4 | 5 | 270 | 500 |
| 5 | 10 | 300 | 0.5-1 |

*"atm" is ambient atmospheric pressure.

Composition E8: The exemplary composition was prepared by an exemplary melt polymerization process. Briefly, the melt reactor was passivated by acid washing, rinsing and drying with nitrogen gas, and charged with 11.12 g of TDP, 3.53 g of PPPBP, 20.00 g of bMSC, and 100 µl of an aqueous solution of TMAH and NaOH in an amount corresponding to about 25 µmol TMAH and 2 µmol NaOH per the total number of moles of TDP and PPPBP combined. After nitrogen purging of the reactor system, the temperature-pressure regime used to carry out the melt polymerization comprised the steps of heating for the indicated time periods at the indicated temperatures and pressures shown in Table 4 below. During the different steps, methyl salicylate by-product was removed from the reaction mixture by distillation. Torque build up during polymerization was observed. After the final reaction stage, the reactor was brought back to atmospheric pressure with a gentle nitrogen flow, and the product copolycarbonate was recovered and analyzed. The product copolycarbonate had a yellowish color. The sample was submitted for refractive index measurement (1.643) and the birefringence was determined (21).

TABLE 4

| step | time (minutes) | temp (° C.) | pressure (mbar) |
| --- | --- | --- | --- |
| 1 | 10 | 200 | atm* |
| 2 | 5 | 220 | atm |
| 3 | 30 | 220 | 500 |
| 4 | 5 | 270 | 500 |
| 5 | 10 | 300 | 0.5-1 |

*"atm" is ambient atmospheric pressure.

Composition information, refractive index data, and Tg data for the exemplary compositions and comparator compositions are shown in Table 5.

TABLE 5

| Sample | Composition* | Composition Ratio | Refractive Index** (RI) | Tg** (° C.) |
| --- | --- | --- | --- | --- |
| CE1 | BPA | 100 | 1.586 (1.584-1.586***) | 150 |
| CE2 | TDP | 100 | 1.656 | 104 |
| CE3 | XHT (33 mol % PPPBP) | 100 | 1.61 | 180 |
| E1 | Sulfone-TDP | 100 | 1.629 | 157 |
| E2 | Sulfone-TDP/BPA | 50/50 | 1.596 | 133 |
| E3 | Sulfone-TDP/ BPA/PPPBP | 50/30/20 | 1.623 | 178 |
| E4 | PPPBP/TDP/ BPA/Pripol 1009 | 40/25/27.5/7.5 | 1.610 | 141 |
| E5 | PPPBP/TDP/ BPA/Pripol 1009 | 40/30/25/5 | 1.609 | 144 |
| E6 | TDP/PPPBP/ Pripol 1009 | 65/30/5 | 1.628 | n.d. |

TABLE 5-continued

| Sample | Composition* | Composition Ratio | Refractive Index** (RI) | Tg** (° C.) |
|---|---|---|---|---|
| E7 | TDP/PPPBP | 85/15 | 1.643 | n.d. |
| E8 | TDP/PPPBP | 70/30 | 1.638 | n.d. |

*"TDP" is 4,4'-thiodiphenol; "Sulfone-TDP" is the sulfone-TDP described in Example 1 herein.
**Carried out as described herein; "n.d." indicates the parameter was not determined.
***Reported RI data; The RI of CE1, CE3, E1, E2, E3 were measured as described herein.

The results in Table 5 below show that the addition of the sulfone-TDP oligomer to BPA results in a modest improvement in refractive index. Comparison of BPA formulations E4 and E5 with CE1, however, show meaningful improvement in refractive index, while exhibiting acceptable glass transition temperatures. The addition of the sulfone-TDP oligomer to PPPBP co-polycarbonate formulations produced the most substantial increases in glass transition temperature and refractive index.

The hydrolytic stability of example E3 was compared with polycarbonate and XHT following the procedure as described herein (see Table 6 below and FIG. 1). Comparison of the PC Mw retention after hydro-aging showed that E3 exhibited higher hydrolytic stability than XHT, and comparable with that of polycarbonate. Significantly, E3 also exhibited a higher refractive index that XHT, while maintaining comparable glass transition temperature.

TABLE 6

| Sample | Days* | Mw | Mn | PDI |
|---|---|---|---|---|
| CE1 | 0 | 57,269 (100%) | 21,115 | 2.71 |
|  | 15 | 54,620 (95.4%) | 20,265 | 2.70 |
|  | 65 | 49,303 (86.1%) | 18,642 | 2.64 |
| CE3 | 0 | 39,155 (100%) | 15,821 | 2.47 |
|  | 15 | 25,641 (65.5%) | 11,131 | 2.30 |
|  | 65 | 15,857 (40.4%) | 6,911 | 2.29 |
| E3 | 0 | 29,936 (100%) | 8,803 | 3.40 |
|  | 15 | 27,033 (90.3%) | 8,141 | 3.32 |
|  | 65 | 23,749 (79.4%) | 7,480 | 3.18 |

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A polycarbonate copolymer composition comprising:
   (a) monomeric units comprising a carbonate unit derived from a first aromatic dihydroxy compound, wherein the carbonate unit comprises the formula:

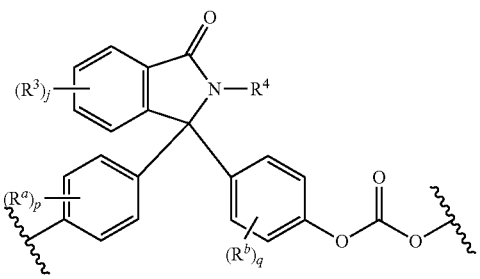

wherein Ra and Rb each represent a halogen atom or a monovalent hydrocarbon group and can be the same or different; p and q are each independently integers of 0 to 4, R3 is each independently a C1-6 alkyl group, j is 0 to 4, and R4 is a C1-6 alkyl, phenyl, or phenyl substituted with up to five C1-6 alkyl groups; and
   (b) monomeric sulfone units comprising the formula

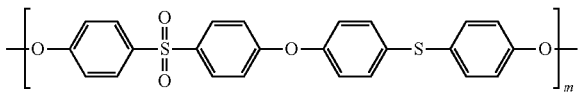

wherein m is from 4-7.

2. The composition of claim 1, further comprising monomeric units (c) comprising a carbonate unit derived from a second aromatic dihydroxy compound.

3. The composition of claim 1, wherein the monomeric units (a) further comprise a carbonate unit derived from a second aromatic dihydroxy compound.

4. The composition of claim 1, wherein the carbonate unit is derived from bisphenol A, PPPBP, bisphenol acetophenone or a combination thereof.

5. The composition of claim 2, wherein the carbonate unit of (a) comprises PPPBP, and wherein the carbonate unit of (c) comprises bisphenol A.

6. The composition of claim 5, wherein the monomeric units (c) further comprises a ester unit derived from an aromatic diol, a C6-C44 aliphatic dicarboxylic acid, or a derivative thereof.

7. The composition of claim 6, wherein the monomeric units (c) comprises a polyester-carbonate.

8. The composition of claim 7, wherein the polyester unit is derived from an aliphatic dicarboxylic acid.

9. The composition of claim 7, wherein the polyester unit is derived from an aliphatic dicarboxylic acid of the formula:

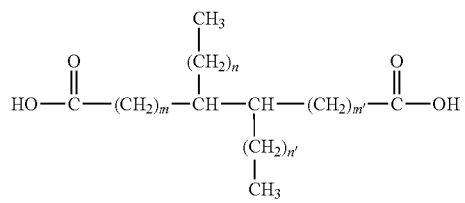

where m and m' are independently 0 to 38, n and n' are independently 0 to 38, and the sum m+m'+n+n' is an integer from 8 to 38.

10. The composition of claim 6, wherein the aliphatic dicarboxylic acid is selected from the group comprising C36 aliphatic dicarboxylic acid, C44 aliphatic dicarboxylic acid, or a combination thereof.

11. The composition of claim 9, wherein the C36 aliphatic dicarboxylic acid comprises a mixture of hydrogenated dimer fatty acids.

12. The composition of claim 5, wherein the wherein the bisphenol-A polycarbonate has a weight-averaged molecular weight from about 18,000 to about 32,000.

13. The composition of claim 5, wherein the bisphenol-A polycarbonate has a weight-averaged molecular weight from about 28,000 to about 32,000.

14. The composition of claim 1, wherein the composition exhibits a refractive index of at least about 1.59.

15. The composition of claim 1, wherein the composition exhibits a refractive index of at least about 1.60.

16. The composition of claim 1, wherein the composition exhibits a refractive index of at least about 1.61.

17. The composition of claim 1, wherein the composition exhibits a refractive index of at least about 1.62.

18. The composition of claim 1, wherein the composition exhibits a refractive index of at least about 1.63.

19. The composition of claim 1, wherein the composition exhibits a refractive index of at least about 1.64.

20. The composition of claim 1, wherein the composition exhibits a glass transition temperature of at least about 130° C.

21. The composition of claim 1, wherein the composition exhibits a glass transition temperature of at least about 135° C.

22. The composition of claim 1, wherein the composition exhibits a glass transition temperature of at least about 140° C.

23. The composition of claim 1, wherein the composition exhibits a glass transition temperature of at least about 145° C.

24. The composition of claim 1, wherein the composition exhibits a glass transition temperature of at least about 150° C.

25. The composition of claim 1, wherein the composition exhibits a glass transition temperature of at least about 155° C.

26. The composition of claim 1, wherein the composition exhibits a glass transition temperature of at least about 160° C.

27. The composition of claim 1, wherein the composition exhibits a glass transition temperature of at least about 165° C.

28. The composition of claim 1, wherein the composition exhibits a glass transition temperature of at least about 170° C.

29. The composition of claim 1, wherein the composition exhibits a glass transition temperature of at least about 175° C.

30. The composition of claim 1, wherein the composition exhibits a glass transition temperature of at least about 180° C.

31. The composition of claim 1, wherein the composition exhibits a glass transition temperature of at least about 185° C.

32. The composition of claim 1, wherein the composition exhibits a glass transition temperature of at least about 133° C.; and wherein the composition exhibits a refractive index of at least about 1.59.

33. The composition of claim 1, wherein the composition exhibits a glass transition temperature of at least about 140° C.; and wherein the composition exhibits a refractive index of at least about 1.59.

34. The composition of claim 1, wherein the composition exhibits a glass transition temperature of at least about 150° C.; and wherein the composition exhibits a refractive index of at least about 1.60.

35. The composition of claim 1, wherein the composition exhibits a glass transition temperature of at least about 160° C.; and wherein the composition exhibits a refractive index of at least about 1.61.

36. The composition of claim 1, wherein the composition exhibits a glass transition temperature of at least about 170° C.; and wherein the composition exhibits a refractive index of at least about 1.62.

37. The composition of claim 1, wherein the composition exhibits a hydrolytic stability with substantially the same weigh average molecular weight retention than that of a reference polycarbonate composition when the hydrolytic stability is determined in a hydrolytic aging chamber for 1000 hours at temperature of about 85° C. with a relative humidity of about 85%.

38. The composition of claim 1, wherein the composition exhibits a hydrolytic stability with at least 10% greater weight average molecular weight retention than that of a reference polycarbonate composition when the hydrolytic stability is determined in a hydrolytic aging chamber for 1000 hours at temperature of about 85° C. with a relative humidity of about 85%, wherein the reference polycarbonate composition comprises a PPPBP/BPA copolycarbonate comprising 33% PPPBP.

39. The composition of claim 1, wherein the composition exhibits a hydrolytic stability with at least 25% greater weight average molecular weight retention than that of a reference polycarbonate composition when the hydrolytic stability is determined in a hydrolytic aging chamber for 1000 hours at temperature of about 85° C. with a relative humidity of about 85%, wherein the reference polycarbonate composition comprises a PPPBP/BPA copolycarbonate comprising 33% PPPBP.

40. The composition of claim 37, wherein the reference polycarbonate composition comprises XHT.

41. The composition of claim 1, wherein the composition exhibits a glass transition temperature of at least about 130° C., a refractive index of at least about 1.59, and a hydrolytic stability with substantially the same weight average molecular weight retention than that of a reference polycarbonate composition when the hydrolytic stability is determined in a hydrolytic aging chamber, wherein the reference polycarbonate composition comprises a PPPBP/BPA copolycarbonate comprising 33% PPPBP.

42. The composition of claim 1, wherein the composition exhibits a glass transition temperature of at least about 170° C., a refractive index of at least about 1.62, and a hydrolytic stability with at least 10% greater weight average molecular weight retention than that of a reference XHT polycarbonate composition when the hydrolytic stability is determined in a hydrolytic aging chamber, wherein the reference polycarbonate composition comprises a PPPBP/BPA copolycarbonate comprising 33% PPPBP.

43. The composition of claim 1, wherein the composition has respective molar ratios of about 10 mol % to about 75 mol % of carbonate units (a); and about 10 mol % to about 90 mol % of sulfone units (b); wherein the mol % of carbonate units (a) and sulfone units (b) combined is 100 mol %.

44. A polycarbonate copolymer composition comprising:
(a) monomeric units comprising a carbonate unit derived from a first aromatic dihydroxy compound, wherein the carbonate unit comprises the formula:

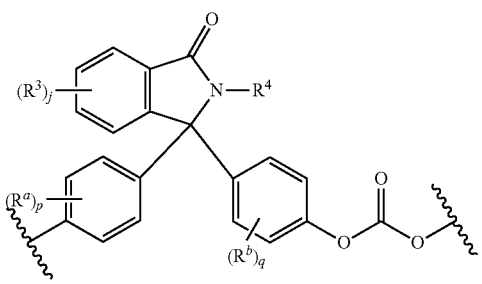

wherein Ra and Rb each represent a halogen atom or a monovalent hydrocarbon group and can be the same or different; p and q are each independently integers of 0 to 4, R3 is each independently a C1-6 alkyl group, j is 0 to 4, and R4 is a C1-6 alkyl, phenyl, or phenyl substituted with up to five C1-6 alkyl groups; and
(b) monomeric sulfone units comprising the formula

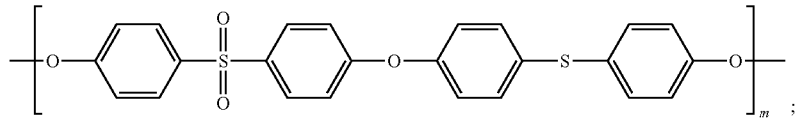

wherein m is 4-7, and
the composition further comprising monomeric units (c) comprising a carbonate unit derived from a second aromatic dihydroxy compound, and
wherein the composition has respective molar ratios of about 10 mol % to about 75 mol % of carbonate units (a); about 10 mol % to about 90 mol % of sulfone units (b); and about 10 mol % to about 75 mol % of carbonate units (c), wherein the mol % of a carbonate units (a), sulfone units (b), and carbonate units (c) combined is 100 mol %.

45. A polycarbonate copolymer composition comprising:
(a) monomeric units comprising a carbonate unit derived from a first aromatic dihydroxy compound, wherein the carbonate unit comprises the formula:

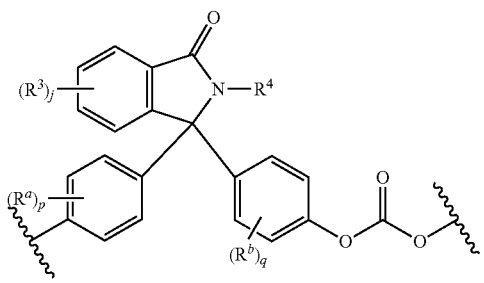

wherein Ra and Rb each represent a halogen atom or a monovalent hydrocarbon group and can be the same or different; p and q are each independently integers of 0 to 4, R3 is each independently a C1-6 alkyl group, j is 0 to 4, and R4 is a C1-6 alkyl, phenyl, or phenyl substituted with up to five C1-6 alkyl groups; and
(b) monomeric sulfone units comprising the formula

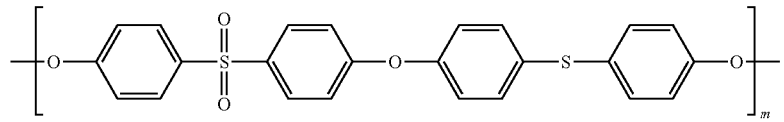

wherein m is from 4-7
the composition further comprising monomeric units (c) comprising a carbonate unit derived from a second aromatic dihydroxy compound, and
the composition further comprising monomeric units (c) comprising a carbonate unit derived from a second aromatic dihydroxy compound, and wherein the carbonate unit of (a) comprises PPPBP, and
wherein the composition has respective molar ratios of
about 10 mol % to about 75 mol % of carbonate units (a);
about 10 mol % to about 90 mol % of sulfone units (b);
about 10 mol % to about 75 mol % of carbonate units (c);
and about 1 mol % to about 25 mol % of ester units,
wherein the mol % of carbonate units (a), sulfone units (b), carbonate units (c) and ester units combined is 100 mol %.

46. The composition of claim 1, wherein the carbonate unit (a) is present in the composition as a total amount from about 10 mol % to about 80 mol %, wherein the mol % of carbonate units (a), and sulfone units (b) combined is 100 mol %.

47. The composition of claim 1, wherein the sulfone unit (b) is present in the composition as a total amount from about 10 mol % to about 90 mol % wherein the mol % of carbonate units (a), and sulfone units (b) combined is 100 mol %.

48. The composition of claim 2, wherein the carbonate unit (a) is present in the composition as a total amount from about 10 mol % to about 80 mol % wherein the mol % of carbonate units (a), sulfone units (b), carbonate units (c), and ester units combined is 100 mol %.

49. The composition of claim 6, wherein the ester unit is present in the composition as a total amount from about 1 mol % to about 25 mol % wherein the mol % of carbonate units (a), sulfone units (b), carbonate units (c), and ester units combined is 100 mol %.

50. The composition of claim 1, wherein the composition further comprises at least one additive selected from thermal stabilizers, antioxidants, UV stabilizers, plasticizers, visual effect enhancers, extenders, antistatic agents, catalyst quenchers, mold releasing agents, fire retardants, blowing agents, impact modifiers and processing aids.

51. An article of manufacture formed from the composition of claim 1.

52. The article of claim 51, wherein the article is an extruded film or sheet.

53. The article of claim 51, wherein the article is injection molded.

54. The article of claim 51, wherein the article is a component for an electronic, imaging, or optical device.

55. The article of claim 52, wherein the device is selected from a mobile phone, a mobile computing device, a camera, a video recorder, a projector, corrective lenses, a diffuser, or a copier.

56. A polycarbonate copolymer composition comprising:
(a) a carbonate unit comprising 2-hydrocarbyl-3,3-bis(4-hydroxyaryl)phthalimidine (PPPBP);

(b) a sulfone unit comprising a compound having the formula:
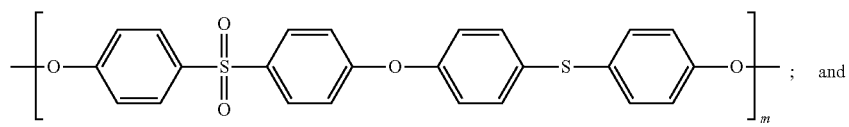
wherein m is 4 to 7; and
(c) a carbonate unit comprising bisphenol A.
57. The composition of claim 56, wherein the carbonate unit (c) further comprises a C6-C44 aliphatic dicarboxylic acid ester unit.
* * * * *